United States Patent
Naik et al.

(12)

(10) Patent No.: US 9,330,402 B2
(45) Date of Patent: May 3, 2016

(54) METHOD AND SYSTEM FOR PROVIDING A PAYROLL PREPARATION PLATFORM WITH USER CONTRIBUTION-BASED PLUG-INS

(71) Applicant: Intuit Inc., Mountain View, CA (US)

(72) Inventors: Mohan Naik, Edmonton (CA); Gorman Ho, Edmonton (CA); Danilo Bangit, Jr., Edmonton (CA); Brad Sinclair, Edmonton (CA)

(73) Assignee: Intuit Inc., Mountain View, CA (US)

(*) Notice: Subject to any disclaimer, the term of this patent is extended or adjusted under 35 U.S.C. 154(b) by 112 days.

(21) Appl. No.: 13/668,014

(22) Filed: Nov. 2, 2012

(65) Prior Publication Data

US 2014/0129398 A1    May 8, 2014

(51) Int. Cl.
G06Q 30/02    (2012.01)
G06Q 40/00    (2012.01)

(52) U.S. Cl.
CPC ............ *G06Q 30/0269* (2013.01); *G06Q 40/12* (2013.12); *G06Q 40/125* (2013.12)

(58) Field of Classification Search
CPC ... G06Q 10/1091; G06Q 10/06; G06Q 10/10; G06Q 10/105; G06Q 40/125
USPC .......................................................... 705/32
See application file for complete search history.

(56) References Cited

U.S. PATENT DOCUMENTS

| | | | |
|---|---|---|---|
| 5,819,249 A | 10/1998 | Dohanich et al. | |
| 6,018,730 A | 1/2000 | Nichols et al. | |
| 6,202,052 B1 | 3/2001 | Miller | |
| 6,253,193 B1 | 6/2001 | Ginter et al. | |
| 7,110,952 B2 | 9/2006 | Kursh | |
| 7,225,199 B1 | 5/2007 | Green et al. | |
| 7,249,072 B1 | 7/2007 | Nearhood et al. | |

(Continued)

FOREIGN PATENT DOCUMENTS

| | | |
|---|---|---|
| WO | WO 03/038693 | 5/2003 |
| WO | WO 2006/026636 | 3/2006 |

OTHER PUBLICATIONS

Doshi, Chintan. An integrated trusted processes framework for consumer-facing B2B networks. University of Ottawa (Canada), ProQuest Dissertations Publishing, 2008.*

(Continued)

*Primary Examiner* — Ryan Zeender
*Assistant Examiner* — Fawaad Haider
(74) *Attorney, Agent, or Firm* — Hawley Troxell Ennis & Hawley LLP; Philip McKay

(57) ABSTRACT

Customizations and regional optimizations made to a payroll preparation and management system by one or more contributing users are transformed into payroll optimization plug-ins. The payroll optimization plug-ins are then aggregated into payroll optimization plug-in sets that, when implemented, optimize the payroll configurations used by the payroll preparation and management system for a given region and/or type of business within the region. The payroll optimization plug-in sets for a given region and/or activity are then requested and/or selected by other individuals using the payroll preparation and management system and imported to the requestor's implementation of the payroll preparation and management system to optimize the requestor's implementation of the payroll preparation and management system for the requested region, and/or type of business within the requested region.

42 Claims, 5 Drawing Sheets

(56) References Cited

U.S. PATENT DOCUMENTS

| | | |
|---|---|---|
| 7,603,301 B1 | 10/2009 | Regan |
| 7,636,742 B1 | 12/2009 | Olavarrieta et al. |
| 7,693,760 B1 | 4/2010 | Fiteni et al. |
| 7,761,484 B2 | 7/2010 | Christensen et al. |
| 7,814,470 B2 | 10/2010 | Mamou et al. |
| 7,853,444 B2 | 12/2010 | Wang et al. |
| 7,860,763 B1 | 12/2010 | Quinn et al. |
| 7,970,796 B1 | 6/2011 | Narayanan |
| 8,170,933 B1 | 5/2012 | Cameron et al. |
| 8,209,229 B1 | 6/2012 | Weiss et al. |
| 8,296,720 B2 | 10/2012 | Coulthard et al. |
| 8,402,047 B1 | 3/2013 | Mangini et al. |
| 8,452,676 B1 | 5/2013 | Talan et al. |
| 2001/0042080 A1 | 11/2001 | Ross |
| 2003/0040899 A1 | 2/2003 | Ogilvie |
| 2003/0167197 A1 | 9/2003 | Shoemaker et al. |
| 2003/0204498 A1 | 10/2003 | Lehnert |
| 2004/0019540 A1 | 1/2004 | William et al. |
| 2004/0019541 A1 | 1/2004 | William et al. |
| 2004/0167768 A1 | 8/2004 | Travieso et al. |
| 2004/0172447 A1 | 9/2004 | Miller |
| 2005/0102283 A1 | 5/2005 | Anderson et al. |
| 2005/0177358 A1 | 8/2005 | Melomed et al. |
| 2006/0080082 A1 | 4/2006 | Ravindra et al. |
| 2006/0155618 A1 | 7/2006 | Wyle |
| 2006/0206310 A1 | 9/2006 | Ravikumar et al. |
| 2007/0021982 A1 | 1/2007 | Sun |
| 2007/0041370 A1 | 2/2007 | Cleveland |
| 2007/0136156 A1 | 6/2007 | Seeley et al. |
| 2009/0063128 A1 | 3/2009 | Seo et al. |
| 2009/0112683 A1 | 4/2009 | Hamilton, II et al. |
| 2010/0042518 A1 | 2/2010 | Handa et al. |
| 2010/0045460 A1 | 2/2010 | Caler et al. |
| 2010/0058169 A1 | 3/2010 | Demant et al. |
| 2010/0198579 A1 | 8/2010 | Cunnington et al. |
| 2011/0022381 A1 | 1/2011 | Gao et al. |
| 2011/0029420 A1 * | 2/2011 | Bianco et al. .......... 705/32 |
| 2011/0087481 A1 | 4/2011 | Yang et al. |
| 2011/0191215 A1 | 8/2011 | Nadler et al. |
| 2011/0191246 A1 | 8/2011 | Brandstetter et al. |
| 2011/0197285 A1 | 8/2011 | Ginter et al. |
| 2011/0264569 A1 | 10/2011 | Houseworth et al. |
| 2012/0017146 A1 | 1/2012 | Travieso et al. |
| 2012/0036078 A1 | 2/2012 | Dean et al. |
| 2012/0060112 A1 | 3/2012 | Wilson et al. |
| 2012/0123766 A1 | 5/2012 | Anisimovich et al. |
| 2012/0191580 A1 | 7/2012 | Bhatt |
| 2012/0239381 A1 | 9/2012 | Heidasch |
| 2012/0278213 A1 | 11/2012 | Bristow et al. |
| 2012/0330721 A1 | 12/2012 | Volpe et al. |
| 2013/0124185 A1 | 5/2013 | Sarr et al. |
| 2013/0151233 A1 | 6/2013 | Gande et al. |
| 2013/0191108 A1 | 7/2013 | Anisimovich et al. |
| 2014/0006004 A1 | 1/2014 | Gundepuneni et al. |
| 2014/0022951 A1 | 1/2014 | Lemieux |
| 2014/0052434 A1 | 2/2014 | Bank et al. |
| 2014/0129209 A1 | 5/2014 | Saleme et al. |
| 2015/0221043 A1 | 8/2015 | Chithambaram et al. |

OTHER PUBLICATIONS

Sharma et al., "Method and System for Creating Tax Configuration Templates," U.S. Appl. No. 13/655,313, filed Oct. 18, 2012.

Goyette et al., "A Content Based Payroll Compliance System," U.S. Appl. No. 13/906,202, filed May 30, 2013.

Intuit, "TurboTax/MacInTax for Business Streamlines Tax Preparation for Small Business Owners," Intuit Press Release, Jan. 6, 1999, 2 pages.

* cited by examiner

US 9,330,402 B2

METHOD AND SYSTEM FOR PROVIDING A PAYROLL PREPARATION PLATFORM WITH USER CONTRIBUTION-BASED PLUG-INS

SUMMARY

In accordance with one embodiment, a method and system for providing a payroll preparation platform with user contribution-based plug-ins provides individuals implementing/using a payroll preparation and management system the capability to share customizations and regional optimizations they have made to their implementations of the payroll preparation and management system with other individuals utilizing the payroll preparation and management system.

In one embodiment, the customizations and regional optimizations made to the implementations of the payroll preparation and management system by one or more contributing users are transformed into payroll optimization plug-ins. The payroll optimization plug-ins associated with the same category, e.g., the same region and/or activity, are then aggregated into payroll optimization plug-in sets that, when implemented, optimize the payroll configurations used by the payroll preparation and management system for a given region and/or type of business within the identified region.

Figure 1:
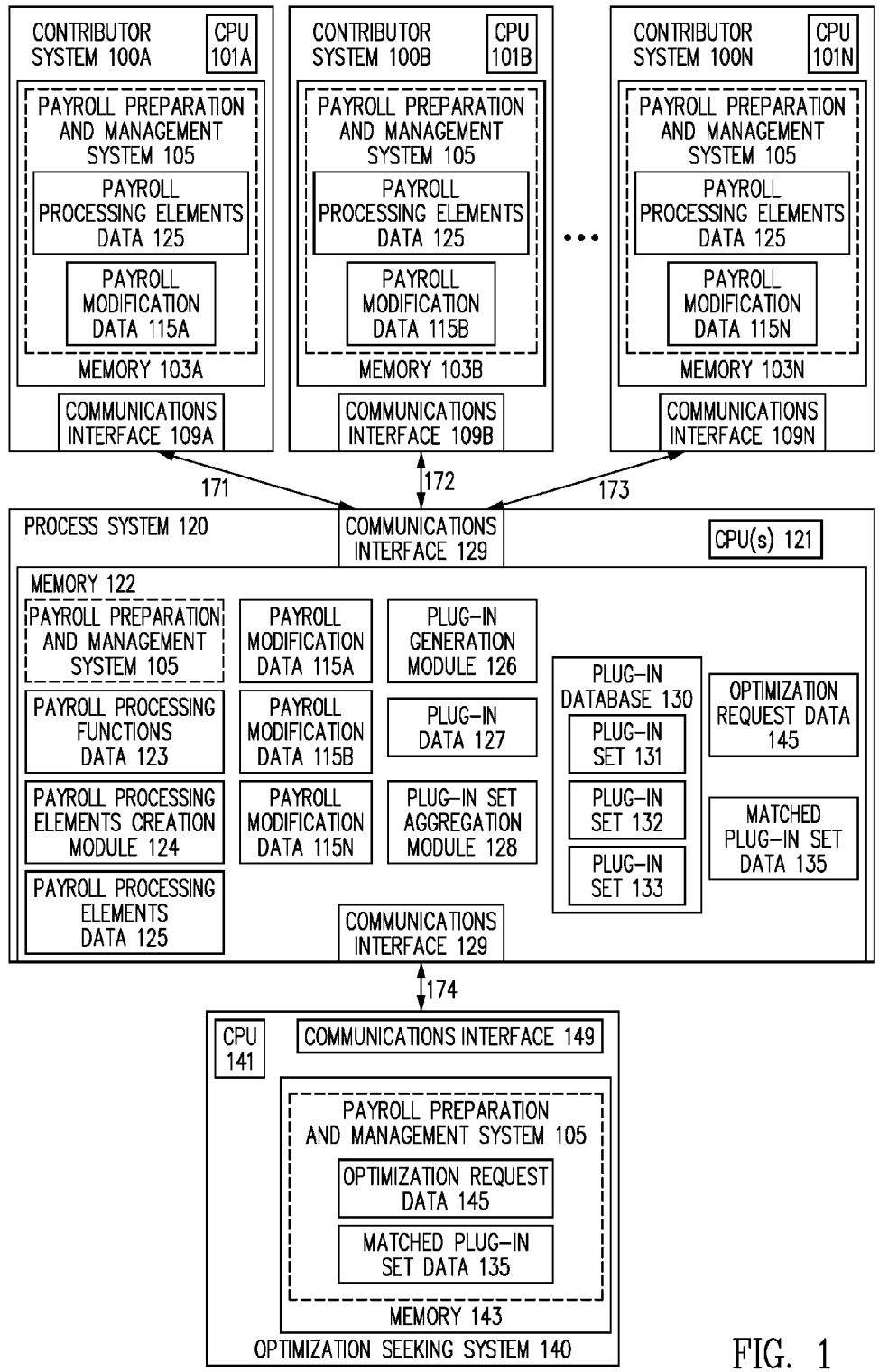
FIG. 1 is a block diagram of an exemplary hardware architecture for implementing one embodiment.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In accordance with one embodiment, a system and method for providing a payroll preparation platform with user contribution-based plug-ins includes a process for providing a payroll preparation platform with user contribution-based plug-ins implemented by one or more processors associated with one or more computing systems.

As used herein, the term "computing system", includes, but is not limited to, a desktop computing system; a portable computing system; a mobile computing system; a laptop computing system; a notebook computing system; a tablet computing system; a workstation; a server computing system; a mobile phone; a smart phone; a wireless telephone; a two-way pager; a Personal Digital Assistant (PDA); a media player, i.e., an MP3 player and/or other music and/or video player; an Internet appliance; or any device that includes components that can execute all, or part, of any one of the processes and/or operations as described herein.

In addition, as used herein, the term computing system, can denote, but is not limited to, systems made up of multiple desktop computing systems; portable computing systems; mobile computing systems; laptop computing systems; notebook computing systems; tablet computing systems; workstations; server computing systems; smart phones; wireless telephones; two-way pagers; Personal Digital Assistants (PDAs); media players; Internet appliances; or any devices that can be used to perform the processes and/or operations as described herein.

In one embodiment, one or more computing systems are connected by one or more communications channels, such as, but not limited to: any general network, communications network, or general network/communications network system; a cellular network; a wireless network; a combination of different network types; a public network; a private network; a satellite network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

In accordance with one embodiment, the process for providing a payroll preparation platform with user contribution-based plug-ins is part of, linked to, or otherwise associated with, one or more payroll preparation and management systems used by one or more individuals.

Herein the terms "individual" and "user" are used interchangeably and include, but are not limited to, any individual party and/or entity as discussed herein, and/or as defined in the art at the time of filing, and/or as defined after the time of filing.

Herein the terms "contributing individual" and "contributing user" are used interchangeably and include, but are not limited to, any individual party and/or entity as discussed herein, and/or as defined in the art at the time of filing, and/or as defined after the time of filing, who provides payroll modification data representing a customization or change to one or more payroll processing elements associated with one or more payroll configurations within a payroll preparation and management system. As used herein, the terms "contributing individual" and "contributing user" can refer to application developers and/or any users of a payroll preparation and management system.

Herein the terms "optimization seeking individual" and "optimization seeking user" are used interchangeably and include, but are not limited to, any individual party and/or entity as discussed herein, and/or as defined in the art at the time of filing, and/or as defined after the time of filing, who desires and/or requests, one or more payroll optimization plug-ins within, or through, a payroll preparation and management system.

Herein, a payroll preparation and management system can be, but is not limited to, any data management system implemented on a computing system and/or accessed through a network that processes financial data, including payroll configuration data, from one or more sources.

Herein, the term "payroll preparation and management system" can denote, but is not limited to, computing system implemented, and/or online, personal and/or business payroll preparation and management systems, packages, programs, modules, or applications; computing system implemented, and/or online, personal and/or business tax preparation systems, packages, programs, modules, or applications; computing system implemented, and/or online, personal and/or business accounting systems, packages, programs, modules, or applications; and various other personal and/or business electronic data management systems, packages, programs, modules, or applications, whether known at the time of filling or as developed later.

The ability to incorporate, process, implement, and apply, various payroll configurations associated with a business is often one of the features that a payroll preparation and management system offers its users, particularly small business users. However, in order to be effective, the payroll preparation and management system has to be able to be used in different countries or regions, each having its own payroll tax system, payroll taxes, payroll tax rates, and payroll tax rules, tec., i.e., having its own "payroll configuration."

In the areas where a regionally optimized version of the payroll preparation and management systems are not created or available, the individual users must either do without the payroll preparation and management systems, or at least a regionally optimized payroll configuration feature, or spend significant resources essentially localizing the payroll preparation and management systems, and creating their own regionally optimized payroll configurations, individually. As a result, hundreds, or thousands, of individuals in the same region and/or business are currently forced to individually create regionally optimized versions of the payroll preparation and management system, including regionally optimized payroll configurations.

Given that these individuals are more often than not creating almost identical individual regionally optimized versions of the payroll preparation and management systems, and regionally optimized payroll configurations; this represents a significant level of redundancy of effort and a huge waste of resources. In short, currently, many individuals in the same region and/or business are forced to each individually "re-invent the wheel" by each individually creating regionally optimized payroll configurations that could be used by everyone in the region if there were a mechanism for sharing regionally optimized payroll configurations.

In addition, even when the payroll preparation and management systems are optimized for a given region, individual users of payroll preparation and management systems still often spend considerable time and other resources to individually and independently configure and customize the payroll preparation and management systems, including payroll configurations, to their business activity, and their local payroll tax structure as applied to that activity in the region.

To address this issue, in one embodiment, individuals employing a payroll preparation and management system are provided the capability to share their customizations and regional optimizations made to payroll configurations with other individuals via payroll optimization plug-ins that are generated based on the customizations and regional optimizations made to the payroll configurations by the one or more contributing individuals.

As used herein, the term payroll optimization plug-ins includes not only optimization plug-ins directed to specific taxes and tax rates, but also optimization plug-ins associated with other payroll functions such as, but not limited to, tax payer deductions, union dues, RRSP matching, sick pay, vacation time, garnishments, retirement savings, and/or any other payroll-related functions as discussed herein, and/or as known in the art at the time of filing, and/or as recognized/identified after the time of filing.

In one embodiment, a payroll preparation and management system is provided to one or more individuals. In one embodiment, the provided payroll preparation and management system is any payroll preparation and management system as discussed herein, and/or as known in the art at the time of filing, and/or as developed after the time of filing.

In various embodiments, the payroll preparation and management system is used by the individuals to, among other things, track employee compensation; track employee tax deductions and exemptions; calculate and withhold employee federal, state, regional, local, and/or activity specific/special taxes; monitor employee vacation and sick time; monitor, apply, and withhold funds for employee and employee dependent benefits; calculate and generate employee paychecks, bonus checks, and other forms of compensation; and/or any one or more other numerous tasks associated with employee compensation, as discussed herein, and/or as known in the art at the time of filing, and/or as developed after the time of filing.

In one embodiment, each of the one or more individuals creates and utilizes their own implementation of the provided payroll preparation and management system. In some embodiments, the individuals access their implementation of the provided payroll preparation and management system from a server computing system and/or a network or cloud. In some embodiments, the individuals run, and access, their implementation of the provided payroll preparation and management system on their own local computing system. In some embodiments, the individuals access their implementation of the provided payroll preparation and management system from a website or any network discussed herein, and/or as known in the art at the time of filing, and/or as developed after the time of filing.

In one embodiment, the provided payroll preparation and management system includes, is a parent system for, or is otherwise associated with, the process for providing a payroll preparation platform with user contribution-based plug-ins.

In one embodiment, a provider of the process for providing a payroll preparation platform with user contribution-based plug-ins identifies various payroll processing functions, illustratively, such as, but not limited to, any one or more of, the employee net pay (EE net pay) calculation function; the employee gross pay (EE gross pay) calculation function; the employee gross taxes (EE gross taxes) calculation function; the employer contribution (ER contributions) calculation function; and/or any other payroll processing functions as discussed herein, known in the art at the time of filing, and/or as developed after the time of filing.

In one embodiment, once the desired payroll processing functions are identified, the desired payroll processing functions are processed, analyzed, and decomposed into payroll processing elements that are factors and/or components of the payroll processing functions.

As a specific illustrative example, in one embodiment, the employee net pay (EE net pay) calculation function is, as a default, calculated as EE net pay is equal to employee gross pay (EE gross pay) minus total employee taxes (EE taxes), that is:

$$EE\ Net\ Pay = EE\ gross\ pay - EE\ taxes.$$

Then, in this example, EE gross pay and EE taxes are payroll processing elements for EE net pay.

However, in one example, total employee taxes (EE taxes) is itself a payroll processing function calculated by adding employee federal taxes (EE fed tax) with employee state taxes (EE state tax) with employee local taxes (EE local tax), that is:

$$EE\ taxes = EE\ fed\ tax + EE\ state\ tax + EE\ local\ tax;\ so\ that$$

$$EE\ Net\ Pay = EE\ gross\ pay - (EE\ fed\ tax + EE\ state\ tax + EE\ local\ tax).$$

Consequently, in this specific example EE fed tax, EE state tax, and EE local tax are payroll processing elements for EE taxes and EE net pay. Also note EE fed tax, EE state tax, and EE local tax are all potentially regionalized payroll processing elements.

As another specific illustrative example, in one embodiment, the employee gross pay (EE gross pay) calculation function is, as a default, calculated as employee wages/compensation (EE wages) added to employee additional compensation (EE additions) minus employee deductions (EE deductions), that is:

$$EE\ gross\ pay = EE\ wages + EE\ additions - EE\ deductions.$$

Consequently, in this specific example, EE wages, EE additions, and EE deductions are payroll processing elements for EE gross pay. Again note that EE additions, and EE deductions can be potentially regionally mandated or variable.

As another specific illustrative example, in one embodiment, the employee gross taxes (EE gross taxes) is, as a default, calculated as EE taxes plus the employer tax taxable contributions (ER tax on taxable contributions), that is:

$$EE\ gross\ taxes = EE\ taxes + ER\ tax\ on\ taxable\ contributions;\ so\ that$$

$$EE\ gross\ taxes = EE\ fed\ tax + EE\ state\ tax + EE\ local\ tax + ER\ tax\ on\ taxable\ contributions.$$

Consequently, in this specific example, EE fed tax, EE state tax, and EE local tax, and ER tax on taxable contributions are payroll processing elements for EE gross taxes. Also note EE fed tax, EE state tax, and EE local tax, and ER tax on taxable contributions are all regionalized payroll processing elements.

As another specific illustrative example, in one embodiment, employer contributions (ER contributions) is calculated as employer non-taxable employer contributions (ER non-taxable ER contributions) added to employer taxable employer contributions (ER taxable ER contributions), that is:

$$ER\ contributions = ER\ non-taxable\ ER\ contributions + ER\ taxable\ ER\ contributions.$$

Consequently, in this specific example, ER non-taxable ER contributions and ER taxable ER contributions are payroll processing elements for ER contributions. Also note ER non-taxable ER contributions and ER taxable ER contributions are all potentially regionalized payroll processing elements.

Those of skill in the art will readily recognize that the payroll processing functions and payroll processing elements discussed above are presented for illustrative purposes and are not intended to limit in any way the scope of the claims presented below. Many different payroll processing functions and payroll processing elements are possible depending on the needs of the individuals, payroll preparation and management system, and/or the provider of the payroll preparation and management system.

For instance, in various embodiments, other payroll processing functions and payroll processing elements can include, but are not limited to, tax payer deductions, union dues, RRSP matching, sick pay, vacation time, garnishments, retirement savings, and/or any other payroll-related functions as discussed herein, and/or as known in the art at the time of filing, and/or as recognized/identified after the time of filing.

In one embodiment, the payroll processing functions are identified, and the desired payroll processing functions are decomposed into payroll processing elements using a Domain Specific Language, or any similar mechanism, that involves production rules with a grammar, as discussed herein, and/or as known in the art at the time of filing, and/or as developed after the time of filing.

In one embodiment, once the desired payroll processing functions are identified, and the desired payroll processing functions are decomposed into payroll processing elements that are factors and/or components of the payroll processing functions, the individuals using the payroll preparation and management system are provided the capability to customize the payroll preparation and management system. In one embodiment, the individuals are provided the capability to customize the payroll preparation and management system for the contributing individual's region, such as a country, state, city, county, zip code, etc., and/or a particular type of business activity within a region, such as retail sales, providing specific services, payroll, production, distribution, etc.

In one embodiment, the individuals are provided the capability to customize a payroll configuration used within the payroll preparation and management system implementation for the contributing individual's region, such as a country, state, city, county, zip code, etc., and/or a particular type of business activity within a region, such as retail sales, providing specific services, payroll, production, distribution, etc.

In one embodiment, the individuals are provided the capability to customize a payroll configuration within the payroll preparation and management system by adding, removing, or modifying any of the payroll processing elements, and therefore modifying the payroll processing functions associated with the added, removed, and/or modified payroll processing elements.

In one embodiment, individuals adding, removing, of modifying payroll processing elements are termed "contributing individuals." In one embodiment, the contributing individuals customize a payroll configuration for a region, and/or type of business activity, through a user interface screen provided by the payroll preparation and management system on a display device of a contributor computing system implementing, or accessing, at least part of the payroll preparation and management system.

In one embodiment, the contributing individual's additions, deletions, and/or modifications of the payroll processing elements are obtained as payroll modification data representing specific additions, deletions, or changes to one or more payroll processing elements made to customize the payroll preparation and management system for the region and/or the type of business activity. In one embodiment, the contributing individual generates payroll modification data representing multiple additions, deletions, and/or modifications of payroll processing elements.

In one embodiment, once the contributing individual generates payroll modification data for a region, and/or type of business activity, at least part of the payroll modification data is designated as "sharable" by the contributing individual and is provided to the payroll preparation and management system. In one embodiment, the contributing individual can designate specific payroll modification data for sharing, or remove payroll modification data from sharing. For instance, in one embodiment, the contributing individual is provided a payroll modification data display through which the contributing individual has the option to designate specific additions, deletions, and/or modifications of payroll processing elements for sharing, and/or remove specific payroll processing elements from sharing.

In one embodiment, the contributing individual can opt to share the contributing individual's complete set of payroll modification data, e.g., share the contributing individual's entire payroll configuration. In other embodiments, the contributing individual can opt to share only data associated with a particular payroll processing function or payroll processing element, such as a designated regional tax, e.g., their local tax agency.

In one embodiment, prior to releasing the contributing individual's payroll modification data for sharing, the contributing individual is presented a payroll configuration display which lists the payroll modification data that will be shared and/or the specific additions, deletions, and/or modifications of payroll processing elements that will be shared.

In one embodiment, once approved for sharing by the contributing individual, the specific additions, deletions, and/or modifications of payroll processing elements are analyzed to ensure there is no personal and/or identifying data associated with the contributing individual.

In one embodiment, the contributing individual is asked to provide contributor payroll modification identification data for the payroll modification data, such as a name for the payroll modification data indicating a specific region, activity, or payroll tax associated with the payroll modification data. In one embodiment, the contributor payroll modification identification data provided is then used to tag/categorize the payroll modification data.

In one embodiment, the payroll modification data is processed to determine system payroll modification identification data to be associated with the payroll modification data. In one embodiment, the system payroll modification identification data is then used, in one embodiment along with the contributor payroll modification identification data, to tag/categorize the payroll modification data.

In one embodiment, once approved for sharing by the contributing individual, the contributing individual's payroll modification data, i.e., the specific additions, deletions, and/or modifications of payroll processing elements for a region, and/or type of business activity, are transformed into one or more payroll optimization plug-ins.

As used here-in the term "plug-in" includes a set of software components that add specific abilities to a larger software application, such as a payroll configuration, and/or payroll preparation and management system. In addition, herein, the term "plug-in" includes add-ons, or addons; snap-ins; traditional plug-ins; extensions; and/or themes that enable customization, and/or modification of, the functionality of an application or system such as a tax configuration, and/or payroll preparation and management system.

The general structure and operation of plug-ins is well known in the art. Consequently the specific process for creating payroll optimization plug-ins is omitted here to avoid detracting from the invention.

In one embodiment, the specific additions, deletions, and/or modifications of payroll processing elements indicated by the contributing individual's payroll modification data are implemented by the one or more payroll optimization plug-ins. In one embodiment, the one or more payroll optimization plug-ins then add, delete, or modify the associated payroll processing functions, and/or the payroll configuration, and/or payroll preparation and management system as appropriate to create a consistent system.

As a specific illustrative example, in one embodiment, if the contributing individual's payroll modification data adds a local farming employee tax (FEE tax) that is required in region X, then a payroll optimization plug-in is created that includes the Fee tax in the total employee taxes (EE taxes) calculation so that EE taxes is calculated by adding employee federal taxes (EE fed tax) with employee state taxes (EE state tax) with employee local taxes (EE local tax) and the FEE tax, that is:

$$EE\ taxes = EE\ fed\ tax + EE\ state\ tax + EE\ local\ tax + FEE\ tax.$$

In this example, the plug-in also results in the employee net pay (EE net pay) being calculated to include the Fee tax so that EE net pay is calculated as equal to employee gross pay (EE gross pay) minus EE taxes, calculated including the Fee tax, that is:

$$EE\ net\ pay = EE\ gross\ pay - (EE\ fed\ tax + EE\ state\ tax + EE\ local\ tax + FEE\ tax).$$

In one embodiment, once the specific additions, deletions, and/or modifications of payroll processing elements indicated by the contributing individual's payroll modification data are transformed into payroll optimization plug-ins, the payroll optimization plug-ins are assigned identification data and categorized according to their identification data. In one embodiment, the system payroll modification identification data and/or the contributor payroll modification identification data used to tag the payroll modification data related to the payroll optimization plug-ins are assigned as identification data and used to categorize the payroll optimization plug-ins.

In various embodiments, the payroll optimization plug-in identification data includes, but is not limited to, data indicating any one or more of the following, the region associated with the contributing individual and/or payroll optimization plug-in; the specific business type and/or activity associated with the contributing individual and/or payroll optimization plug-in; the type of payroll tax associated with the contributing individual and/or payroll optimization plug-in; the tax agencies involved, e.g., the agency name, filling frequency, financial year, reporting standard; the various payroll tax rates calculated on net amount or region, location, type of business, tax type etc.

In one embodiment, all payroll optimization plug-ins of the same category are the aggregated into payroll optimization plug-in sets for the identified region and/or business activity categorization. In one embodiment, the payroll optimization plug-in sets are then stored/added to a payroll optimization plug-in set database associated with the payroll preparation and management system. In one embodiment, the payroll optimization plug-in set database associated with the payroll preparation and management system includes all payroll optimization plug-ins submitted by contributing individuals from one or more tax regions.

As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

In one embodiment, the payroll optimization plug-in sets are optionally reviewed, rated, and/or approved for use. In some embodiments, the payroll optimization plug-in sets are reviewed and/or rated, either actively or passively, by individuals who have implemented the payroll optimization plug-in sets. In some embodiments, the payroll optimization plug-in sets are rated based on the reputation/history of the contributing individual. In some embodiments, the payroll optimization plug-in sets are reviewed and/or approved by the provider of the process for providing a payroll preparation platform with user contribution-based plug-ins and/or the payroll preparation and management system.

In various embodiments, the payroll optimization plug-in sets for a given region and/or activity are then requested and/or selected by other individuals using the payroll preparation and management system. Herein the other individuals requesting and/or selecting payroll optimization plug-in sets are referred to as "optimization seeking individuals".

In one embodiment, the requested/selected payroll optimization plug-in set is then imported to the optimization seeking individual's implementation of the payroll preparation and management system to optimize the optimization seeking individual's implementation of the payroll preparation and management system for the requested region, and/or type of business within the requested region.

In various embodiments, the payroll optimization plug-ins for a given region can be immediately adopted by other optimization seeking individuals as they were submitted by contributing individuals. In other embodiments, the payroll optimization plug-ins for a given region are reviewed, and/or rated, and/or "approved" before they are adopted by other optimization seeking individuals.

Using the system and method for providing a payroll preparation platform with user contribution-based plug-ins discussed herein, when a contributing individual optimizes the payroll configuration of a payroll preparation and management system for a specific region and/or business type, payroll modification data representing the optimizations is transformed into payroll optimization plug-ins. The payroll optimization plug-ins are then provided to other individuals. Consequently, using the system and method for providing a payroll preparation platform with user contribution-based plug-ins discussed herein, region specific versions of payroll configurations used with payroll preparation and management systems are shared in an efficient and resource conserving manner.

Hardware System Architecture

FIG. 1 is a block diagram of an exemplary hardware architecture for implementing one embodiment of a process for providing a payroll preparation platform with user contribution-based plug-ins, such as exemplary process 300 (FIG. 3) discussed herein.

FIG. 1 includes contributor systems 100A, 100B, through 100N, e.g., "N" representative computing systems associated with "N" contributing individuals who provide payroll modification data 115A, 115B, through 115N; process system 120, e.g., a computing system associated with a provider of a process for providing a payroll preparation platform with user contribution-based plug-ins; a representative optimization seeking system 140, e.g., a computing system associated with a optimization seeking individual using optimization request data 145 to request a regional and/or activity based optimization for their implementation of payroll preparation and management system 105; and communication channels 171, 172, 173, and 174.

As seen in FIG. 1, contributor systems 100A, 100B, through 100N include processor/Central Processing Units (CPUs) 101A, 101B, through 101N, memories 103A, 103B, through 103N, and communication interfaces 109A, 109B, through 109N.

In some embodiments, memories 103A, 103B, through 103N include all or part of payroll preparation and management system 105. In various embodiments, payroll preparation and management system 105 is any payroll preparation and management system as discussed herein, and/or as known/available in the art at the time of filing, and/or as developed/made available after the time of filing. In one embodiment, payroll preparation and management system 105 is a computing system implemented payroll preparation and management system.

In some embodiments, memories 103A, 103B, through 103N include all or part of payroll processing elements data 125, as provided from process system 120, through communications interfaces 109A, 109B, through 109N, communications channels 171, 172, and/or 173, and communications interface 129. As discussed below, in one embodiment, a provider of the process for providing a payroll preparation platform with user contribution-based plug-ins identifies various payroll processing functions (payroll processing functions data 123) utilized by payroll preparation and management system 105, such as but not limited to, any one or more of, the employee net pay (EE net pay) calculation function; the employee gross pay (EE gross pay) calculation function; the employee gross taxes (EE gross taxes) calculation function; the employer contribution (ER contributions) calculation function; and/or any other payroll processing functions as discussed herein, known in the art at the time of filing, and/or as developed after the time of filing.

In one embodiment, once the desired payroll processing functions of payroll processing functions data 123 are identified, the desired payroll processing functions of payroll processing functions data 123 are processed, analyzed, and decomposed into payroll processing elements that are factors and/or components of the payroll processing functions. In one embodiment, the payroll processing elements are represented by payroll processing elements data 125.

It is worth noting that, in some embodiments, while payroll processing elements data 125 is included as part of payroll preparation and management system 105, payroll processing elements data 125 is not necessarily specifically, and/or separately, displayed to the contributing individuals. That is to say, the contributing individuals are not necessarily provided separate displays, indications of, or other data presentations calling payroll processing elements data 125 to the contributing individual's attention, nor are they necessarily aware of payroll processing elements data 125. Instead, in these embodiments, payroll processing elements data 125 is simply included in the contributing individual's implementation of payroll preparation and management system 105.

In some embodiments, memories 103A, 103B, through 103N include all or part of payroll modification data 115A, 115B, through 115N. As discussed below, the contributing individuals associated with contributor systems 100A, 100B, through 100N utilizing payroll preparation and management system 105 are provided the capability to customize and optimize a payroll configuration used by payroll preparation and management system 105 for the contributing individual's region, such as a country, state, city, county, zip code, etc., and/or a particular type of business activity within a region, such as retail sales, providing specific services, payroll, production, distribution, etc.

In one embodiment, in the course of customizing and optimizing a payroll configuration used by payroll preparation and management system 105, the contributing individuals make additions, deletions, and/or modifications of/to the payroll processing elements of payroll processing elements data 125. In one embodiment, the contributing individual's additions, deletions, and/or modifications to the payroll processing elements of payroll processing elements data 125 are then transformed into payroll modification data 115A, 115B, through 115N.

In one embodiment, payroll modification data 115A, 115B, through 115N is then provided to process system 120 through payroll preparation and management system 105, communications interfaces 109A, 109B, through 109N, communications channels 171, 172, and 173, and communications interface 129.

Contributor systems 100A, 100B, through 100N, as shown in FIG. 1, are representative of any number "N" computing systems associated with one or more individuals. As discussed herein, payroll modification data 115A, 115B, through 115N in FIG. 1, can be obtained from a large number of contributing individuals, even as many as thousands, or hundreds of thousands, or millions of individuals. Consequently, in various embodiments, contributor systems 100A, 100B, through 100N can be representative of thousands, hundreds of thousands, or even millions, of contributor systems and/or payroll modification data 115A, 115B, through 115N can be representative of payroll modification data received from thousands, hundreds of thousands, or even millions, of contributing individuals. Consequently, the three representative contributor systems 100A, 100B, through 100N are shown in FIG. 1 for illustrative purposes and are not limiting to the claims presented below.

In various embodiments, contributor systems 100A, 100B, through 100N can be any computing system discussed herein, and/or as known in the art at the time of filing, and/or as developed after the time of filing.

In various embodiments, contributor systems 100A, 100B, through 100N may further include standard interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, contributor systems 100A, 100B, through 100N, whether available or known at the time of filing or as later developed.

Process system 120 can be any computing system as discussed herein, and/or as known in the art at the time of filing, and/or as developed thereafter, that includes components that can execute all, or part, of a process for providing a payroll preparation platform with user contribution-based plug-ins in accordance with at least one of the embodiments as described herein.

In one embodiment, process system 120 includes one or more Central Processing Units (CPUs) 121, memory 122, and communications interface 129.

In one embodiment, memory 122 includes all, or part, of payroll preparation and management system 105. In some embodiments, payroll preparation and management system 105 is any payroll preparation and management system as discussed herein, and/or as known/available in the art at the time of filing, and/or as developed/made available after the time of filing. In one embodiment, payroll preparation and management system 105 is a web-based, or server implemented, payroll preparation and management system.

In one embodiment, memory 122 includes all, or part, of payroll processing functions data 123. As discussed above, a provider of the process for providing a payroll preparation platform with user contribution-based plug-ins identifies various payroll processing functions, represented in FIG. 1 as payroll processing functions data 123, utilized by payroll preparation and management system 105, such as but not limited to, any one or more of, the employee net pay (EE net pay) calculation function; the employee gross pay (EE gross pay) calculation function; the employee gross taxes (EE gross taxes) calculation function; the employer contribution (ER contributions) calculation function; and/or any other payroll processing functions as discussed herein, known in the art at the time of filing, and/or as developed after the time of filing.

As also discussed above, in one embodiment, once the desired payroll processing functions of payroll processing functions data 123 are identified, the desired payroll processing functions of payroll processing functions data 123 are processed, analyzed, and decomposed by payroll processing elements creation module 124 into payroll processing elements that are factors and/or components of the payroll processing functions. In one embodiment, the payroll processing elements are represented by payroll processing elements data 125.

In one embodiment, memory 122 includes all, or part, of payroll modification data 115A, 115B, through 115N received from contributor systems 100A, 100B, through 100N, and through payroll preparation and management system 105.

As noted above, in one embodiment, in the course of customizing and optimizing a payroll configuration used by payroll preparation and management system 105, the contributing individuals make additions, deletions, and/or modifications of the payroll processing elements of payroll processing elements data 125. In one embodiment, the contributing individual's additions, deletions, and/or modifications to the payroll processing elements of payroll processing elements data 125 are then transformed into payroll modification data 115A, 115B, through 115N.

In one embodiment, memory 122 includes all, or part, of plug-in generation module 126 used to transform at least part of payroll modification data 115A, 115B, through 115N into one or more payroll optimization plug-ins, represented by plug-in data 127 in FIG. 1. In one embodiment, the one or more payroll optimization plug-ins represented by plug-in data 127 are designed/generated to implement the specific additions, deletions, and/or modifications of the payroll processing elements of payroll processing elements data 125 indicated by payroll modification data 115A, 115B, through 115N.

As used here-in the term "plug-in" includes a set of software components that add specific abilities to a larger software application, such as a payroll configuration, and/or payroll preparation and management system. In addition, herein, the term "plug-in" includes add-ons, or addons; snap-ins;

traditional plug-ins; extensions; and/or themes that enable customization, and/or modification of, the functionality of an application or system such as a tax configuration, and/or payroll preparation and management system.

The general structure and operation of plug-ins is well known in the art. Consequently the specific process for creating payroll optimization plug-ins is omitted here to avoid detracting from the invention.

In one embodiment, memory 122 includes all, or part, of plug-in set aggregation module 128. In one embodiment, plug-in set aggregation module 128 is used to identify and aggregate all payroll optimization plug-ins of plug-in data 127 that are of the same category, e.g., are associated with the same region, payroll tax, and/or activity, into payroll optimization plug-in sets, represented as plug-in set 131, plug-in set 132, and plug-in set 133. In one embodiment, the payroll optimization plug-in sets include all the submitted, and/or approved, payroll optimization plug-ins for the identified region and/or business activity categorization.

In one embodiment, the payroll optimization plug-in sets, plug-in set 131, plug-in set 132, and plug-in set 133, are then stored/added to a payroll optimization plug-in set database, represented as plug-in database 130 in FIG. 1, associated with payroll preparation and management system 105. In one embodiment, plug-in database 130 includes all payroll optimization plug-ins submitted by contributing individuals from one or more tax regions.

In one embodiment, memory 122 includes all, or part, of optimization request data 145. As discussed below, in one embodiment, optimization request data 145 is received from optimization seeking system 140 via payroll preparation and management system 105, communications interface 149, communications channel 174, and communications interface 129.

As discussed below, in one embodiment, an optimization seeking individual associated with optimization seeking system 140 obtains access to plug-in database 130 and provides optimization request data 145 to indicate a desire to implement a payroll configuration optimized for their region, and/or business type. In one embodiment, optimization request data 145 includes data indicating the optimization seeking individual's desired search parameters, such as, but not limited to, any one or more of, the tax region and the business type, etc.

In one embodiment, optimization request data 145 is used to search plug-in database 130. In one embodiment plug-in database 130 is searched for one or more payroll optimization plug-in sets, e.g., one or more of plug-in sets 131, 132 and 133, matching, or most closely matching, the entered search parameters of optimization request data 145.

In one embodiment, the optimization seeking individual then selects a payroll optimization plug-in set, represented by matched plug-in set data 135 in FIG. 1, matching, or most closely matching, the optimization seeking individual's needs.

Process system 120 may further include standard interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, process system 120, whether available or known at the time of filing or as later developed.

Optimization seeking system 140 can be any computing system as discussed herein, and/or as known in the art at the time of filing, and/or as developed thereafter, that includes components that can execute all, or part, of a process for providing a payroll preparation platform with user contribution-based plug-ins in accordance with at least one of the embodiments as described herein.

In one embodiment, optimization seeking system 140 includes one or more Central Processing Units (CPUs) 141, memory 143, and communications interface 149.

In one embodiment, memory 143 includes all, or part, of payroll preparation and management system 105. In some embodiments, payroll preparation and management system 105 is any payroll preparation and management system as discussed herein, and/or as known/available in the art at the time of filing, and/or as developed/made available after the time of filing. In one embodiment, payroll preparation and management system 105 is a computing system implemented, or web-based, and/or server implemented payroll preparation and management system.

In one embodiment, memory 143 includes optimization request data 145 as provided to process system 120 and matched plug-in set data 135 as received from process system 120 via communications interface 129, communications channel 174, and communications interface 149.

Optimization seeking system 140 may further include standard interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, process system 120, whether available or known at the time of filing or as later developed.

In one embodiment, any, or all, of communications channels 171, 172, 173, and 174 can be, but are not limited to: any network; a mobile communication link, such as a mobile phone link; a land-line phone link; a cable-based communications channel; a satellite communications channel; the Internet, a cloud, or other network communications channel; and/or any other communications channel, or combination of communications channels, as discussed herein, and/or as known in the art at the time of filing, and/or as developed after the time of filing.

In one embodiment, contributor systems 100A, 100B, through 100N, provider system 120, and/or optimization seeking system 140 are part of a cloud computing environment.

Those of skill in the art will readily recognize that the components shown in FIG. 1, and their respective sub-components, are shown for illustrative purposes only and that architectures with more or fewer components can implement, and benefit from, the invention. In addition, the particular type of, and configuration of, contributor systems 100A, 100B, through 100N, provider system 120, and/or optimization seeking system 140 are not relevant.

In various embodiments, the elements shown in FIG. 1 are grouped into one or more processes, or sub-processes, used to implement all, or part of, a process for providing a payroll preparation platform with user contribution-based plug-ins, such as exemplary process 300 (FIG. 3) discussed herein.

Figure 2A:
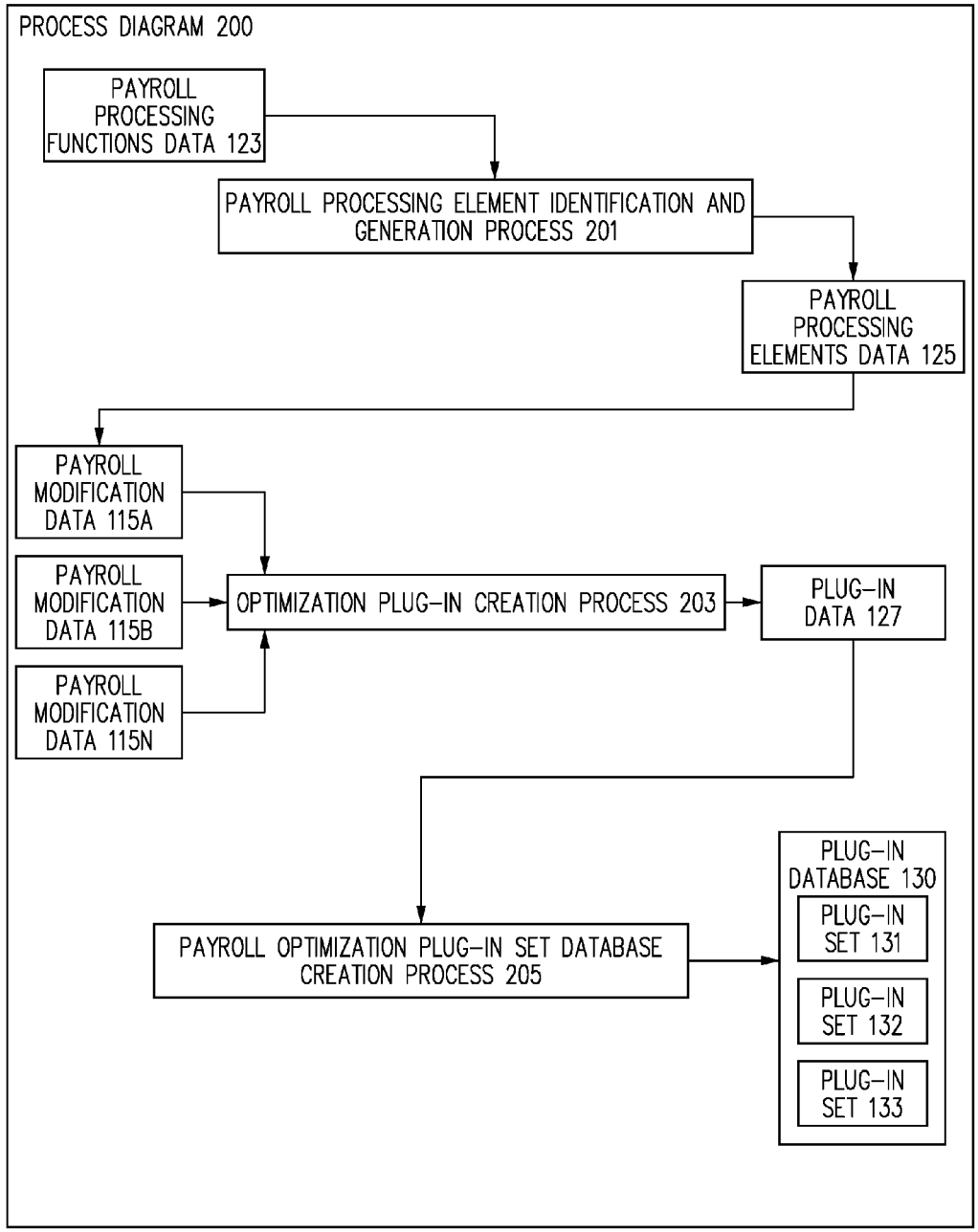
FIG. 2A is a process diagram of part of a process for providing a payroll preparation platform with user contribution-based plug-ins in accordance with one embodiment.

FIG. 2A is a process diagram showing one illustrative example of the interaction of various illustrative processes, or sub-processes, 201, 203, and 205 used to implement part of a process for providing a payroll preparation platform with user contribution-based plug-ins, such as exemplary process 300 (FIG. 3) discussed herein.

Figure 2B:
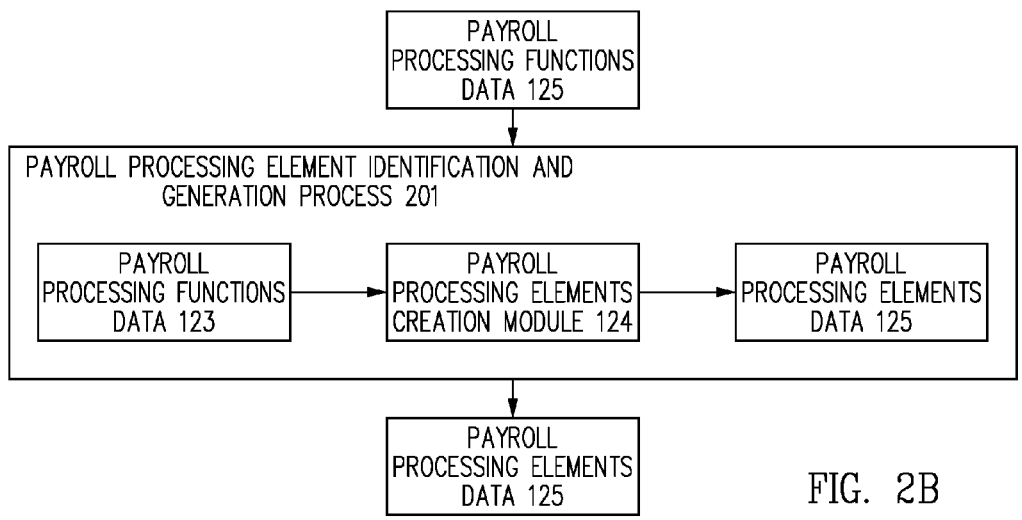
FIG. 2B shows a payroll processing element identification and generation process in accordance with one embodiment.
Figure 2C:
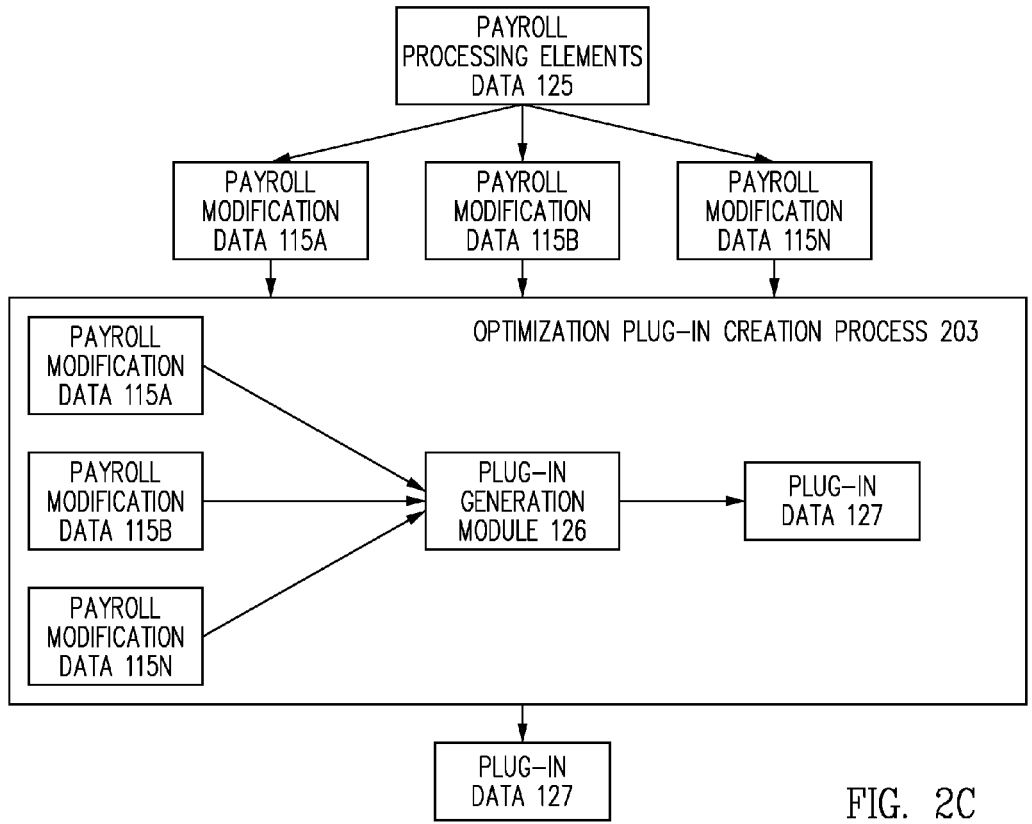
FIG. 2C shows a payroll optimization plug-in creation process in accordance with one embodiment.
Figure 2D:
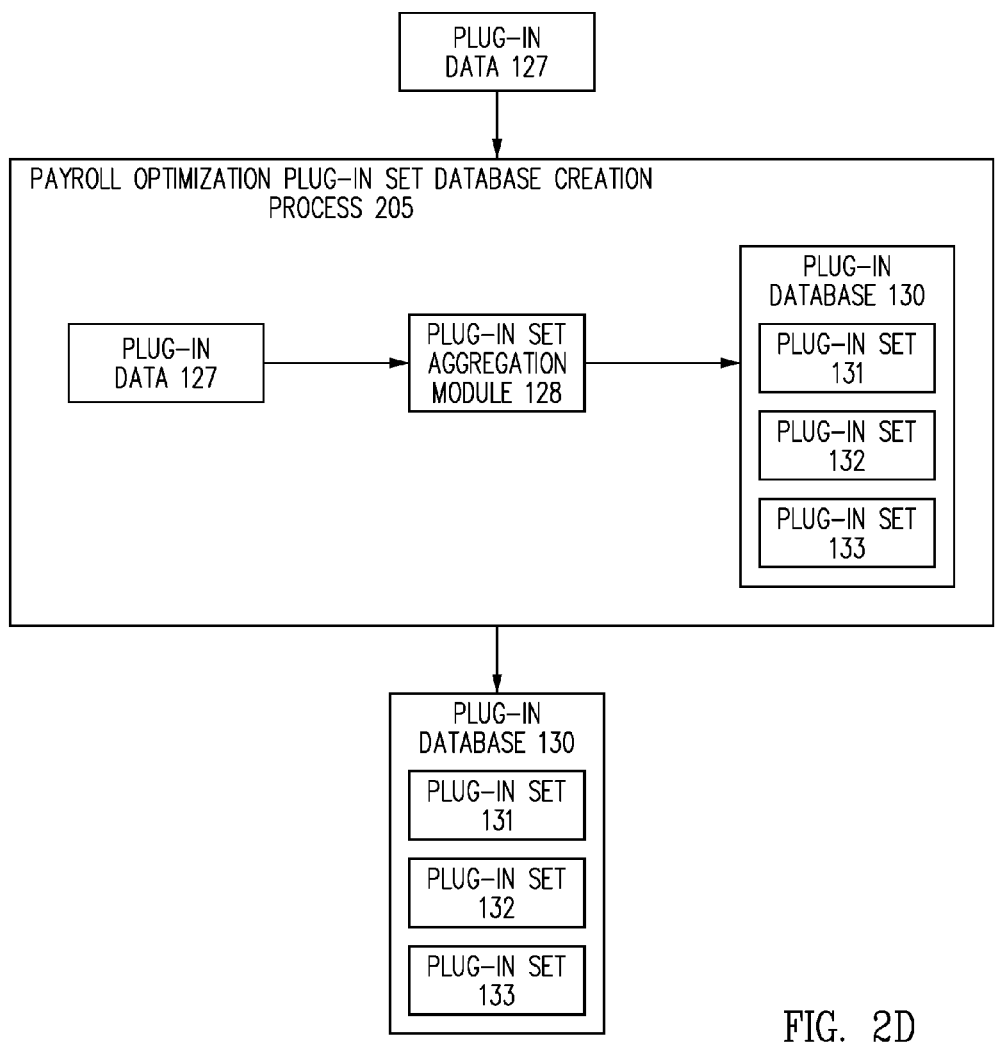
FIG. 2D shows a payroll optimization plug-in set database creation process in accordance with one embodiment.

FIGS. 2B, 2C and 2D show illustrative examples of processes 201, 203 and 205 in accordance with one embodiment.

Referring to FIG. 1, FIG. 2A, FIG. 2B, FIG. 2C, and FIG. 2D together, payroll processing functions data 123 is provided to payroll processing element identification and generation process 201 which transforms at least part of payroll processing functions data 123 into payroll processing elements data 125. Payroll processing element identification and generation process 201 is shown in more detail in FIG. 2B.

As seen in FIG. 2B, payroll processing functions data 123 is provided as input data to payroll processing elements creation module 124. As discussed above, a provider of the process for providing a payroll preparation platform with user contribution-based plug-ins identifies various payroll processing functions, represented as payroll processing functions data 123, utilized by payroll preparation and management system 105 (FIG. 1), such as but not limited to, any one or more of, the employee net pay (EE net pay) calculation function; the employee gross pay (EE gross pay) calculation function; the employee gross taxes (EE gross taxes) calculation function; the employer contribution (ER contributions) calculation function; and/or any other payroll processing functions as discussed herein, known in the art at the time of filing, and/or as developed after the time of filing.

In one embodiment, payroll processing elements creation module 124 transforms at least part of payroll processing functions data 123 into payroll processing elements data 125. In one embodiment, payroll processing elements creation module 124 transforms at least part of payroll processing functions data 123 into payroll processing elements data 125 by decomposing payroll processing functions data 123 into payroll processing elements that are factors and/or components of the payroll processing functions.

As a specific illustrative example, in one embodiment, the employee net pay (EE net pay) calculation function is, as a default, calculated as EE net pay is equal to employee gross pay (EE gross pay) minus total employee taxes (EE taxes), that is:

$EE$ Net Pay=$EE$ gross pay–$EE$ taxes.

Then, in this example, EE gross pay and EE taxes are payroll processing elements for EE net pay.

However, in one example, total employee taxes (EE taxes) is itself a payroll processing function calculated by adding employee federal taxes (EE fed tax) with employee state taxes (EE state tax) with employee local taxes (EE local tax), that is:

$EE$ taxes=$EE$ fed tax+$EE$ state tax+$EE$ local tax; so that $EE$ Net Pay=$EE$ gross pay–($EE$ fed tax+$EE$ state tax+ $EE$ local tax).

Consequently, in this specific example EE fed tax, EE state tax, and EE local tax are payroll processing elements for EE taxes and EE net pay. Also note EE fed tax, EE state tax, and EE local tax are all potentially regionalized payroll processing elements.

As another specific illustrative example, in one embodiment, the employee gross pay (EE gross pay) calculation function is, as a default, calculated as employee wages/compensation (EE wages) added to employee additional compensation (EE additions) minus employee deductions (EE deductions), that is:

$EE$ gross pay=$EE$ wages+$EE$ additions–$EE$ deductions.

Consequently, in this specific example, EE wages, EE additions, and EE deductions are payroll processing elements for EE gross pay. Again note that EE additions, and EE deductions can be potentially regionally mandated or variable.

As another specific illustrative example, in one embodiment, the employee gross taxes (EE gross taxes) is, as a default, calculated as EE taxes plus the employer tax taxable contributions (ER tax on taxable contributions), that is:

$EE$ gross taxes=$EE$ taxes+$ER$ tax on taxable contributions; so that $EE$ gross taxes=$EE$ fed tax+$EE$ state tax+$EE$ local tax+$ER$ tax on taxable contributions.

Consequently, in this specific example, EE fed tax, EE state tax, and EE local tax, and ER tax on taxable contributions are payroll processing elements for EE gross taxes. Also note EE fed tax, EE state tax, and EE local tax, and ER tax on taxable contributions are all regionalized payroll processing elements.

As another specific illustrative example, in one embodiment, employer contributions (ER contributions) is calculated as employer non-taxable employer contributions (ER non-taxable ER contributions) added to employer taxable employer contributions (ER taxable ER contributions), that is:

$ER$ contributions=$ER$ non-taxable $ER$ contributions+ $ER$ taxable $ER$ contributions.

Consequently, in this specific example, ER non-taxable ER contributions and ER taxable ER contributions are payroll processing elements for ER contributions. Also note ER non-taxable ER contributions and ER taxable ER contributions are all potentially regionalized payroll processing elements.

Those of skill in the art will readily recognize that the payroll processing functions and payroll processing elements discussed above are presented for illustrative purposes and are not intended to limit in any way the scope of the claims presented below. Many different payroll processing functions and payroll processing elements are possible depending on the needs of the individuals, payroll preparation and management system, and/or the provider of the payroll preparation and management system.

In one embodiment, payroll processing elements creation module 124 transforms at least part of payroll processing functions data 123 into payroll processing elements data 125 by decomposing payroll processing functions data 123 into payroll processing elements using a Domain Specific Language, or any similar mechanism, that involves production rules with a grammar, as discussed herein, and/or as known in the art at the time of filing, and/or as developed after the time of filing.

Referring back to FIG. 1, FIG. 2A, FIG. 2B, FIG. 2C, and FIG. 2D together, payroll modification data 115A, 115B, through 115N are provided to optimization plug-in creation process 203 where payroll modification data 115A, 115B, through 115N are transformed into plug-in data 127. FIG. 2C shows optimization plug-in creation process 203 in more detail.

As noted above, in some embodiments, while payroll processing elements data 125 are included as part of payroll preparation and management system 105 (FIG. 1), payroll processing elements data 125 is not necessarily specifically, and/or separately, displayed to the contributing individuals. That is to say, the contributing individuals are not necessarily provided separate displays, indications of, or other data presentations calling payroll processing elements data 125 to the contributing individual's attention. Indeed, in many instances, the contributing individuals are not aware of payroll processing elements data 125 at all. Instead, in these embodiments, payroll processing elements data 125 is simply included in the contributing individual's implementation of payroll preparation and management system 105.

As also noted above, in the course of customizing and optimizing a payroll configuration used by payroll preparation and management system 105, the contributing individuals make additions, deletions, and/or modifications of the payroll processing elements of payroll processing elements data 125. In one embodiment, the contributing individual's additions, deletions, and/or modifications to the payroll processing elements of payroll processing elements data 125 are then transformed into payroll modification data 115A, 115B, through 115N.

As seen in FIG. 2B, payroll modification data 115A, 115B, through 115N is used as input data to plug-in generation module 126 that processes payroll modification data 115A, 115B, through 115N to generate plug-in data 127. In one embodiment, plug-in data 127 represents one or more payroll optimization plug-ins designed/generated to implement the specific additions, deletions, and/or modifications of the payroll processing elements of payroll processing elements data 125 indicated by payroll modification data 115A, 115B, through 115N.

As used here-in the term "plug-in" includes a set of software components that add specific abilities to a larger software application, such as a payroll configuration, and/or payroll preparation and management system. In addition, herein, the term "plug-in" includes add-ons, or addons; snap-ins; traditional plug-ins; extensions; and/or themes that enable customization, and/or modification of, the functionality of an application or system such as a tax configuration, and/or payroll preparation and management system.

The general structure and operation of plug-ins is well known in the art. Consequently the specific process for creating payroll optimization plug-ins used by plug-in generation module 126 is omitted here to avoid detracting from the invention.

Referring back to FIG. 1, FIG. 2A, FIG. 2B, FIG. 2C, and FIG. 2D together, plug-in data 127 is provided to payroll optimization plug-in set database creation process 205 which transforms plug-in data 127 into plug-in sets 131, 132, and 133 to create plug-in database 130. FIG. 2D shows payroll optimization plug-in set database creation process 205.

As seen in FIG. 2D, plug-in data 127 is used as input data to plug-in set aggregation module 128. In one embodiment, the payroll optimization plug-ins of plug-in data 127 are assigned identification data and categorized according to their identification data by plug-in set aggregation module 128. In one embodiment, system payroll modification identification data and/or contributor payroll modification identification data used to tag the payroll modification data related to the payroll optimization plug-ins are assigned as identification data by plug-in set aggregation module 128 and used to categorize the payroll optimization plug-ins of plug-in data 127.

In various embodiments, the payroll optimization plug-in identification data includes, but is not limited to, data indicating any one or more of the following, the region associated with the contributing individual and/or payroll optimization plug-in; the specific business type and/or activity associated with the contributing individual and/or payroll optimization plug-in; the type of payroll tax associated with the contributing individual and/or payroll optimization plug-in; the tax agencies involved, e.g., the agency name, filling frequency, financial year, reporting standard; the various payroll tax rates calculated on net amount or region, location, type of business, tax type etc.

In one embodiment, plug-in set aggregation module 128 aggregates all payroll optimization plug-ins of plug-in data 127 having the same category into payroll optimization plug-in sets, such as plug-in sets 131, 132, and 133, for the identified region and/or business activity categorization.

Although three payroll optimization plug-in sets are shown in FIGS. 1, 2A, and 2C, i.e., plug-in sets 131, 132, and 133, plug-in sets 131, 132, and 133 are representative of any number of payroll optimization plug-in sets. Consequently the illustrative example of three payroll optimization plug-in sets is not limiting to the claims presented below.

In one embodiment, plug-in set aggregation module 128 then adds the payroll optimization plug-in sets to plug-in database 130, i.e., a payroll optimization plug-in set database associated with payroll preparation and management system 105.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, a method and system for providing a payroll preparation platform with user contribution-based plug-ins provides individuals implementing/using a payroll preparation and management system the capability to share customizations and regional optimizations they have made to their implementations of the payroll preparation and management system with other individuals utilizing the payroll preparation and management system.

In one embodiment, the customizations and regional optimizations made to the implementations of the payroll preparation and management system by one or more contributing users are transformed into payroll optimization plug-ins. The payroll optimization plug-ins associated with the same category, e.g., the same region and/or activity, are then aggregated into payroll optimization plug-in sets that, when implemented, optimize the payroll configurations used by the payroll preparation and management system for a given region and/or type of business within the identified region.

Figure 3:
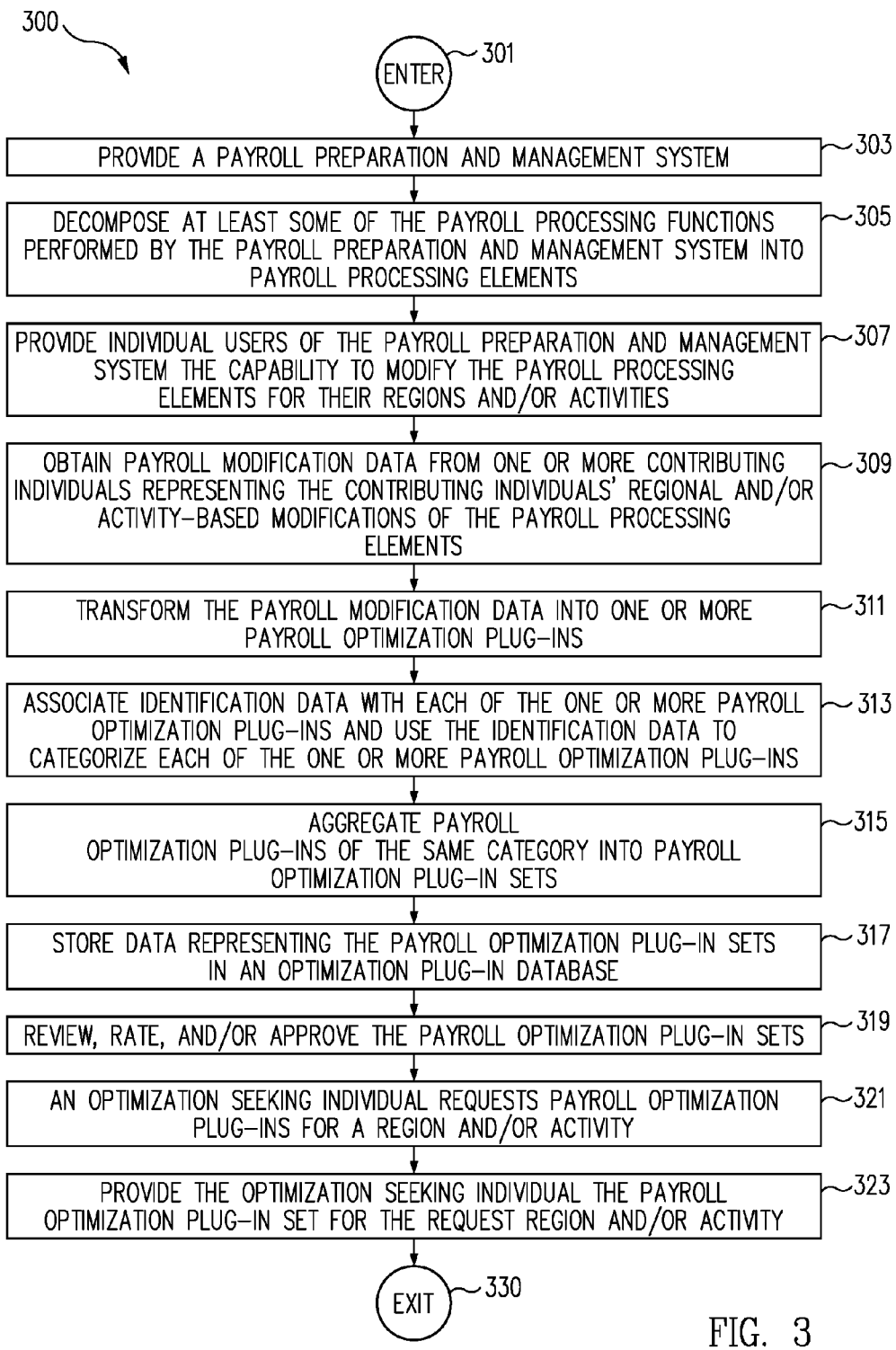
FIG. 3 is a flow chart depicting a process for providing a payroll preparation platform with user contribution-based plug-ins in accordance with one embodiment.

FIG. 3 is a flow chart depicting a process 300 for providing a payroll preparation platform with user contribution-based plug-ins in accordance with one embodiment. Process 300 for providing a payroll preparation platform with user contribution-based plug-ins begins at ENTER OPERATION 301 of FIG. 3 and process flow proceeds to PROVIDE A PAYROLL PREPARATION AND MANAGEMENT SYSTEM OPERATION 303.

In accordance with one embodiment, process 300 for providing a payroll preparation platform with user contribution-based plug-ins is part of, linked to, or otherwise associated with, one or more payroll preparation and management systems used by one or more individuals.

Herein the terms "individual" and "user" are used interchangeably and include, but are not limited to, any individual party and/or entity as discussed herein, and/or as defined in the art at the time of filing, and/or as defined after the time of filing.

Herein the terms "contributing individual" and "contributing user" are used interchangeably and include, but are not limited to, any individual party and/or entity as discussed herein, and/or as defined in the art at the time of filing, and/or as defined after the time of filing, who provides payroll modification data representing a customization or change to one or more payroll processing elements associated with one or more payroll configurations within a payroll preparation and management system. As used herein, the terms "contributing individual" and "contributing user" can refer to application developers and/or any users of a payroll preparation and management system.

Herein the terms "optimization seeking individual" and "optimization seeking user" are used interchangeably and include, but are not limited to, any individual party and/or entity as discussed herein, and/or as defined in the art at the time of filing, and/or as defined after the time of filing, who desires and/or requests, one or more payroll optimization plug-ins within, or through, a payroll preparation and management system.

Herein, a payroll preparation and management system can be, but is not limited to, any data management system implemented on a computing system and/or accessed through a network that processes financial data, including payroll configuration data, from one or more sources.

Herein, the term "payroll preparation and management system" can denote, but is not limited to, computing system implemented, and/or online, personal and/or business payroll preparation and management systems, packages, programs, modules, or applications; computing system implemented, and/or online, personal and/or business tax preparation systems, packages, programs, modules, or applications; computing system implemented, and/or online, personal and/or business accounting systems, packages, programs, modules, or applications; and various other personal and/or business electronic data management systems, packages, programs, modules, or applications, whether known at the time of filing or as developed later.

In one embodiment, at PROVIDE A PAYROLL PREPARATION AND MANAGEMENT SYSTEM OPERATION 303 a payroll preparation and management system is provided to one or more individuals.

In one embodiment, the payroll preparation and management system provided at PROVIDE A PAYROLL PREPARATION AND MANAGEMENT SYSTEM OPERATION 303 is any payroll preparation and management system as discussed herein, and/or as known in the art at the time of filing, and/or as developed after the time of filing.

In various embodiments, the payroll preparation and management system provided at PROVIDE A PAYROLL PREPARATION AND MANAGEMENT SYSTEM OPERATION 303 is used by the individuals to, among other things, track employee compensation; track employee tax deductions and exemptions; calculate and withhold employee federal, state, regional, local, and/or activity specific/special taxes; monitor employee vacation and sick time; monitor, apply, and withhold funds for employee and employee dependent benefits; calculate and generate employee paychecks, bonus checks, and other forms of compensation; and/or any one or more other numerous tasks associated with employee compensation, as discussed herein, and/or as known in the art at the time of filing, and/or as developed after the time of filing.

In one embodiment, each of the one or more individuals creates and utilizes their own implementation of the payroll preparation and management system provided at PROVIDE A PAYROLL PREPARATION AND MANAGEMENT SYSTEM OPERATION 303.

In some embodiments, the individuals access their implementation of the payroll preparation and management system provided at PROVIDE A PAYROLL PREPARATION AND MANAGEMENT SYSTEM OPERATION 303 from a server computing system and/or a network or cloud.

In some embodiments, the individuals run, and access, their implementation of the payroll preparation and management system provided at PROVIDE A PAYROLL PREPARATION AND MANAGEMENT SYSTEM OPERATION 303 on their own local computing system.

In some embodiments, the individuals access their implementation of the payroll preparation and management system provided at PROVIDE A PAYROLL PREPARATION AND MANAGEMENT SYSTEM OPERATION 303 from a website or any network discussed herein, and/or as known in the art at the time of filing, and/or as developed after the time of filing.

In one embodiment, the payroll preparation and management system provided at PROVIDE A PAYROLL PREPARATION AND MANAGEMENT SYSTEM OPERATION 303 includes, is a parent system for, or is otherwise associated with, process 300 for providing a payroll preparation platform with user contribution-based plug-ins.

In one embodiment, once a payroll preparation and management system is provided to one or more individuals at PROVIDE A PAYROLL PREPARATION AND MANAGEMENT SYSTEM OPERATION 303, process flow proceeds to DECOMPOSE AT LEAST SOME OF THE PAYROLL PROCESSING FUNCTIONS PERFORMED BY THE PAYROLL PREPARATION AND MANAGEMENT SYSTEM INTO PAYROLL PROCESSING ELEMENTS OPERATION 305.

In one embodiment, at DECOMPOSE AT LEAST SOME OF THE PAYROLL PROCESSING FUNCTIONS PERFORMED BY THE PAYROLL PREPARATION AND MANAGEMENT SYSTEM INTO PAYROLL PROCESSING ELEMENTS OPERATION 305 a provider of process 300 for providing a payroll preparation platform with user contribution-based plug-ins identifies various payroll processing functions and the payroll processing functions are processed, analyzed, and decomposed into payroll processing elements that are factors and/or components of the payroll processing functions.

In one embodiment, at DECOMPOSE AT LEAST SOME OF THE PAYROLL PROCESSING FUNCTIONS PERFORMED BY THE PAYROLL PREPARATION AND MANAGEMENT SYSTEM INTO PAYROLL PROCESSING ELEMENTS OPERATION 305 a provider of process 300 for providing a payroll preparation platform with user contribution-based plug-ins identifies various payroll processing functions such as but not limited to, any one or more of, the employee net pay (EE net pay) calculation function; the employee gross pay (EE gross pay) calculation function; the employee gross taxes (EE gross taxes) calculation function; the employer contribution (ER contributions) calculation function; and/or any other payroll processing functions as discussed herein, known in the art at the time of filing, and/or as developed after the time of filing.

In one embodiment, once the desired payroll processing functions are identified, the desired payroll processing functions are processed, analyzed, and decomposed into payroll processing elements that are factors and/or components of the payroll processing functions at DECOMPOSE AT LEAST SOME OF THE PAYROLL PROCESSING FUNCTIONS PERFORMED BY THE PAYROLL PREPARATION AND MANAGEMENT SYSTEM INTO PAYROLL PROCESSING ELEMENTS OPERATION 305.

As a specific illustrative example, in one embodiment, the employee net pay (EE net pay) calculation function is, as a default, calculated as EE net pay is equal to employee gross pay (EE gross pay) minus total employee taxes (EE taxes), that is:

$$EE\ Net\ Pay = EE\ gross\ pay - EE\ taxes.$$

Then, in this example, EE gross pay and EE taxes are payroll processing elements for EE net pay.

However, in one example, total employee taxes (EE taxes) is itself a payroll processing function calculated by adding employee federal taxes (EE fed tax) with employee state taxes (EE state tax) with employee local taxes (EE local tax), that is:

$$EE\ taxes = EE\ fed\ tax + EE\ state\ tax + EE\ local\ tax;\ so\ that$$

$$EE\ Net\ Pay = EE\ gross\ pay - (EE\ fed\ tax + EE\ state\ tax + EE\ local\ tax).$$

Consequently, in this specific example EE fed tax, EE state tax, and EE local tax are payroll processing elements for EE taxes and EE net pay. Also note EE fed tax, EE state tax, and EE local tax are all potentially regionalized payroll processing elements.

As another specific illustrative example, in one embodiment, the employee gross pay (EE gross pay) calculation function is, as a default, calculated as employee wages/compensation (EE wages) added to employee additional compensation (EE additions) minus employee deductions (EE deductions), that is:

$$EE\ gross\ pay = EE\ wages + EE\ additions - EE\ deductions.$$

Consequently, in this specific example, EE wages, EE additions, and EE deductions are payroll processing elements for EE gross pay. Again note that EE additions, and EE deductions can be potentially regionally mandated or variable.

As another specific illustrative example, in one embodiment, the employee gross taxes (EE gross taxes) is, as a default, calculated as EE taxes plus the employer tax taxable contributions (ER tax on taxable contributions), that is:

$$EE\ gross\ taxes = EE\ taxes + ER\ tax\ on\ taxable\ contributions;\ so\ that$$

$$EE\ gross\ taxes = EE\ fed\ tax + EE\ state\ tax + EE\ local\ tax + ER\ tax\ on\ taxable\ contributions.$$

Consequently, in this specific example, EE fed tax, EE state tax, and EE local tax, and ER tax on taxable contributions are payroll processing elements for EE gross taxes. Also note EE fed tax, EE state tax, and EE local tax, and ER tax on taxable contributions are all regionalized payroll processing elements.

As another specific illustrative example, in one embodiment, employer contributions (ER contributions) is calculated as employer non-taxable employer contributions (ER non-taxable ER contributions) added to employer taxable employer contributions (ER taxable ER contributions), that is:

$$ER\ contributions = ER\ non-taxable\ ER\ contributions + ER\ taxable\ ER\ contributions.$$

Consequently, in this specific example, ER non-taxable ER contributions and ER taxable ER contributions are payroll processing elements for ER contributions. Also note ER non-taxable ER contributions and ER taxable ER contributions are all potentially regionalized payroll processing elements.

Those of skill in the art will readily recognize that the payroll processing functions and payroll processing elements discussed above are presented for illustrative purposes and are not intended to limit in any way the scope of the claims presented below. Many different payroll processing functions and payroll processing elements are possible depending on the needs of the individuals, payroll preparation and management system, and/or the provider of the payroll preparation and management system.

Those of skill in the art will readily recognize that the payroll processing functions and payroll processing elements discussed above are presented for illustrative purposes and are not intended to limit in any way the scope of the claims presented below. Many different payroll processing functions and payroll processing elements are possible depending on the needs of the individuals, payroll preparation and management system, and/or the provider of the payroll preparation and management system.

For instance, in various embodiments, other payroll processing functions and payroll processing elements can include, but are not limited to, tax payer deductions, union dues, RRSP matching, sick pay, vacation time, garnishments, retirement savings, and/or any other payroll-related functions as discussed herein, and/or as known in the art at the time of filing, and/or as recognized/identified after the time of filing.

In one embodiment, at DECOMPOSE AT LEAST SOME OF THE PAYROLL PROCESSING FUNCTIONS PERFORMED BY THE PAYROLL PREPARATION AND MANAGEMENT SYSTEM INTO PAYROLL PROCESSING ELEMENTS OPERATION 305 the payroll processing functions are identified, and the desired payroll processing functions are decomposed into payroll processing elements using a Domain Specific Language, or any similar mechanism, that involves production rules with a grammar, as discussed herein, and/or as known in the art at the time of filing, and/or as developed after the time of filing.

In one embodiment, at DECOMPOSE AT LEAST SOME OF THE PAYROLL PROCESSING FUNCTIONS PERFORMED BY THE PAYROLL PREPARATION AND MANAGEMENT SYSTEM INTO PAYROLL PROCESSING ELEMENTS OPERATION 305 the payroll processing functions are identified, and the desired payroll processing functions are decomposed into payroll processing elements under the direction of one or more processors, such as CPU 121 of FIG. 1, associated with one or more computing systems, such as process system 120 of FIG. 1.

Returning to FIG. 3, in one embodiment, once various payroll processing functions are identified and the payroll processing functions are processed, analyzed, and decomposed into payroll processing elements that are factors and/or components of the payroll processing functions at DECOMPOSE AT LEAST SOME OF THE PAYROLL PROCESSING FUNCTIONS PERFORMED BY THE PAYROLL PREPARATION AND MANAGEMENT SYSTEM INTO PAYROLL PROCESSING ELEMENTS OPERATION 305, process flow proceeds to PROVIDE INDIVIDUAL USERS OF THE PAYROLL PREPARATION AND MANAGEMENT SYSTEM THE CAPABILITY TO MODIFY THE

PAYROLL PROCESSING ELEMENTS FOR THEIR REGIONS AND/OR ACTIVITIES OPERATION 307.

In one embodiment, at PROVIDE INDIVIDUAL USERS OF THE PAYROLL PREPARATION AND MANAGEMENT SYSTEM THE CAPABILITY TO MODIFY THE PAYROLL PROCESSING ELEMENTS FOR THEIR REGIONS AND/OR ACTIVITIES OPERATION 307 the individuals using the payroll preparation and management system of PROVIDE A PAYROLL PREPARATION AND MANAGEMENT SYSTEM OPERATION 303 are provided the capability to customize the payroll preparation and management system.

In one embodiment, at PROVIDE INDIVIDUAL USERS OF THE PAYROLL PREPARATION AND MANAGEMENT SYSTEM THE CAPABILITY TO MODIFY THE PAYROLL PROCESSING ELEMENTS FOR THEIR REGIONS AND/OR ACTIVITIES OPERATION 307 the individuals are provided the capability to customize the payroll preparation and management system for the contributing individual's region, such as a country, state, city, county, zip code, etc., and/or a particular type of business activity within a region, such as retail sales, providing specific services, payroll, production, distribution, etc.

In one embodiment, at PROVIDE INDIVIDUAL USERS OF THE PAYROLL PREPARATION AND MANAGEMENT SYSTEM THE CAPABILITY TO MODIFY THE PAYROLL PROCESSING ELEMENTS FOR THEIR REGIONS AND/OR ACTIVITIES OPERATION 307 the individuals are provided the capability to customize a payroll configuration used within the payroll preparation and management system implementation for the contributing individual's region, such as a country, state, city, county, zip code, etc., and/or a particular type of business activity within a region, such as retail sales, providing specific services, payroll, production, distribution, etc.

In one embodiment, at PROVIDE INDIVIDUAL USERS OF THE PAYROLL PREPARATION AND MANAGEMENT SYSTEM THE CAPABILITY TO MODIFY THE PAYROLL PROCESSING ELEMENTS FOR THEIR REGIONS AND/OR ACTIVITIES OPERATION 307 the individuals are provided the capability to customize a payroll configuration within the payroll preparation and management system by adding, removing, or modifying any of the payroll processing elements, and therefore modifying the payroll processing functions associated with the added, removed, and/or modified payroll processing elements.

In one embodiment, individuals adding, removing, of modifying payroll processing elements are termed "contributing individuals." In one embodiment, at PROVIDE INDIVIDUAL USERS OF THE PAYROLL PREPARATION AND MANAGEMENT SYSTEM THE CAPABILITY TO MODIFY THE PAYROLL PROCESSING ELEMENTS FOR THEIR REGIONS AND/OR ACTIVITIES OPERATION 307 the contributing individuals customize a payroll configuration for a region, and/or type of business activity, through a user interface screen provided by the payroll preparation and management system on a display device of a contributor computing system implementing, or accessing, at least part of the payroll preparation and management system.

In one embodiment, once the individuals using the payroll preparation and management system of PROVIDE A PAYROLL PREPARATION AND MANAGEMENT SYSTEM OPERATION 303 are provided the capability to customize the payroll preparation and management system at PROVIDE INDIVIDUAL USERS OF THE PAYROLL PREPARATION AND MANAGEMENT SYSTEM THE CAPABILITY TO MODIFY THE PAYROLL PROCESSING ELEMENTS FOR THEIR REGIONS AND/OR ACTIVITIES OPERATION 307 process flow proceeds to OBTAIN PAYROLL MODIFICATION DATA FROM ONE OR MORE CONTRIBUTING INDIVIDUALS REPRESENTING THE CONTRIBUTING INDIVIDUALS' REGIONAL AND/OR ACTIVITY-BASED MODIFICATIONS OF THE PAYROLL PROCESSING ELEMENTS OPERATION 309.

In one embodiment, at OBTAIN PAYROLL MODIFICATION DATA FROM ONE OR MORE CONTRIBUTING INDIVIDUALS REPRESENTING THE CONTRIBUTING INDIVIDUALS' REGIONAL AND/OR ACTIVITY-BASED MODIFICATIONS OF THE PAYROLL PROCESSING ELEMENTS OPERATION 309, any contributing individual's additions, deletions, and/or modifications of the payroll processing elements made at PROVIDE INDIVIDUAL USERS OF THE PAYROLL PREPARATION AND MANAGEMENT SYSTEM THE CAPABILITY TO MODIFY THE PAYROLL PROCESSING ELEMENTS FOR THEIR REGIONS AND/OR ACTIVITIES OPERATION 307 are obtained as payroll modification data representing specific additions, deletions, or changes to one or more payroll processing elements made to customize the payroll preparation and management system for the region and/or the type of business activity.

In one embodiment, at OBTAIN PAYROLL MODIFICATION DATA FROM ONE OR MORE CONTRIBUTING INDIVIDUALS REPRESENTING THE CONTRIBUTING INDIVIDUALS' REGIONAL AND/OR ACTIVITY-BASED MODIFICATIONS OF THE PAYROLL PROCESSING ELEMENTS OPERATION 309 the contributing individual generates payroll modification data representing multiple additions, deletions, and/or modifications of payroll processing elements.

In one embodiment, the payroll modification data is obtained at OBTAIN PAYROLL MODIFICATION DATA FROM ONE OR MORE CONTRIBUTING INDIVIDUALS REPRESENTING THE CONTRIBUTING INDIVIDUALS' REGIONAL AND/OR ACTIVITY-BASED MODIFICATIONS OF THE PAYROLL PROCESSING ELEMENTS OPERATION 309 from contributor computing systems, such as any computing system discussed herein, and/or as known in the art/available at the time of filing, and/or as developed/made available after the time of filing.

In one embodiment, at OBTAIN PAYROLL MODIFICATION DATA FROM ONE OR MORE CONTRIBUTING INDIVIDUALS REPRESENTING THE CONTRIBUTING INDIVIDUALS' REGIONAL AND/OR ACTIVITY-BASED MODIFICATIONS OF THE PAYROLL PROCESSING ELEMENTS OPERATION 309 the contributing individuals' payroll modification data is obtained via one or more means for transferring data such as, but not limited to, providing the data through one or more network locations; e-mail; text message; POTS; or any other method, means, mechanism, process or procedure for transferring data discussed herein, and/or as known/available in the art at the time of filing, and/or as developed/made available after the time of filing.

In one embodiment, once the contributing individual generates payroll modification data for a region, and/or type of business activity, at OBTAIN PAYROLL MODIFICATION DATA FROM ONE OR MORE CONTRIBUTING INDIVIDUALS REPRESENTING THE CONTRIBUTING INDIVIDUALS' REGIONAL AND/OR ACTIVITY-BASED MODIFICATIONS OF THE PAYROLL PROCESSING ELEMENTS OPERATION 309 at least part of the payroll modification data is designated as "sharable" by the contributing individual and is provided to the payroll preparation and management system.

In one embodiment, at OBTAIN PAYROLL MODIFICATION DATA FROM ONE OR MORE CONTRIBUTING INDIVIDUALS REPRESENTING THE CONTRIBUTING INDIVIDUALS' REGIONAL AND/OR ACTIVITY-BASED MODIFICATIONS OF THE PAYROLL PROCESSING ELEMENTS OPERATION 309 the contributing individual can designate specific payroll modification data for sharing, or remove payroll modification data from sharing.

For instance, in one embodiment, at OBTAIN PAYROLL MODIFICATION DATA FROM ONE OR MORE CONTRIBUTING INDIVIDUALS REPRESENTING THE CONTRIBUTING INDIVIDUALS' REGIONAL AND/OR ACTIVITY-BASED MODIFICATIONS OF THE PAYROLL PROCESSING ELEMENTS OPERATION 309 the contributing individual is provided a payroll modification data display through which the contributing individual has the option to designate specific additions, deletions, and/or modifications of payroll processing elements for sharing, and/or remove specific payroll processing elements from sharing.

In one embodiment, at OBTAIN PAYROLL MODIFICATION DATA FROM ONE OR MORE CONTRIBUTING INDIVIDUALS REPRESENTING THE CONTRIBUTING INDIVIDUALS' REGIONAL AND/OR ACTIVITY-BASED MODIFICATIONS OF THE PAYROLL PROCESSING ELEMENTS OPERATION 309 the contributing individual can opt to share the contributing individual's complete set of payroll modification data, e.g., share the contributing individual's entire payroll configuration. In other embodiments, at OBTAIN PAYROLL MODIFICATION DATA FROM ONE OR MORE CONTRIBUTING INDIVIDUALS REPRESENTING THE CONTRIBUTING INDIVIDUALS' REGIONAL AND/OR ACTIVITY-BASED MODIFICATIONS OF THE PAYROLL PROCESSING ELEMENTS OPERATION 309 the contributing individual can opt to share only data associated with a particular payroll processing function or payroll processing element, such as a designated regional tax, e.g., their local tax agency.

In one embodiment, prior to releasing the contributing individual's payroll modification data for sharing, the contributing individual is presented a payroll configuration display which lists the payroll modification data that will be shared and/or the specific additions, deletions, and/or modifications of payroll processing elements that will be shared at OBTAIN PAYROLL MODIFICATION DATA FROM ONE OR MORE CONTRIBUTING INDIVIDUALS REPRESENTING THE CONTRIBUTING INDIVIDUALS' REGIONAL AND/OR ACTIVITY-BASED MODIFICATIONS OF THE PAYROLL PROCESSING ELEMENTS OPERATION 309.

In one embodiment, once approved for sharing by the contributing individual, the specific additions, deletions, and/or modifications of payroll processing elements are analyzed at OBTAIN PAYROLL MODIFICATION DATA FROM ONE OR MORE CONTRIBUTING INDIVIDUALS REPRESENTING THE CONTRIBUTING INDIVIDUALS' REGIONAL AND/OR ACTIVITY-BASED MODIFICATIONS OF THE PAYROLL PROCESSING ELEMENTS OPERATION 309 to ensure there is no personal and/or identifying data associated with the contributing individual.

In one embodiment, at OBTAIN PAYROLL MODIFICATION DATA FROM ONE OR MORE CONTRIBUTING INDIVIDUALS REPRESENTING THE CONTRIBUTING INDIVIDUALS' REGIONAL AND/OR ACTIVITY-BASED MODIFICATIONS OF THE PAYROLL PROCESSING ELEMENTS OPERATION 309 the contributing individual is asked to provide contributor payroll modification identification data for the payroll modification data, such as a name for the payroll modification data indicating a specific region, activity, or payroll tax associated with the payroll modification data. In one embodiment, the contributor payroll modification identification data provided is then used to tag/categorize the payroll modification data.

In one embodiment, at OBTAIN PAYROLL MODIFICATION DATA FROM ONE OR MORE CONTRIBUTING INDIVIDUALS REPRESENTING THE CONTRIBUTING INDIVIDUALS' REGIONAL AND/OR ACTIVITY-BASED MODIFICATIONS OF THE PAYROLL PROCESSING ELEMENTS OPERATION 309 the payroll modification data is processed to determine system payroll modification identification data to be associated with the payroll modification data. In one embodiment, the system payroll modification identification data is then used, in one embodiment along with the contributor payroll modification identification data, to tag/categorize the payroll modification data.

In one embodiment, once any contributing individual's additions, deletions, and/or modifications of the payroll processing elements made at PROVIDE INDIVIDUAL USERS OF THE PAYROLL PREPARATION AND MANAGEMENT SYSTEM THE CAPABILITY TO MODIFY THE PAYROLL PROCESSING ELEMENTS FOR THEIR REGIONS AND/OR ACTIVITIES OPERATION 307 are obtained as payroll modification data representing specific additions, deletions, or changes to one or more payroll processing elements made to customize the payroll preparation and management system for the region and/or the type of business activity at OBTAIN PAYROLL MODIFICATION DATA FROM ONE OR MORE CONTRIBUTING INDIVIDUALS REPRESENTING THE CONTRIBUTING INDIVIDUALS' REGIONAL AND/OR ACTIVITY-BASED MODIFICATIONS OF THE PAYROLL PROCESSING ELEMENTS OPERATION 309, process flow proceeds to TRANSFORM THE PAYROLL MODIFICATION DATA INTO ONE OR MORE PAYROLL OPTIMIZATION PLUG-INS OPERATION 311.

In one embodiment, at TRANSFORM THE PAYROLL MODIFICATION DATA INTO ONE OR MORE PAYROLL OPTIMIZATION PLUG-INS OPERATION 311, the contributing individuals' payroll modification data, i.e., the specific additions, deletions, and/or modifications of payroll processing elements for a region, and/or type of business activity, of OBTAIN PAYROLL MODIFICATION DATA FROM ONE OR MORE CONTRIBUTING INDIVIDUALS REPRESENTING THE CONTRIBUTING INDIVIDUALS' REGIONAL AND/OR ACTIVITY-BASED MODIFICATIONS OF THE PAYROLL PROCESSING ELEMENTS OPERATION 309 are transformed into one or more payroll optimization plug-ins.

As used here-in the term "plug-in" includes a set of software components that add specific abilities to a larger software application, such as a payroll configuration, and/or payroll preparation and management system. In addition, herein, the term "plug-in" includes add-ons, or addons; snap-ins; traditional plug-ins; extensions; and/or themes that enable customization, and/or modification of, the functionality of an application or system such as a tax configuration, and/or payroll preparation and management system.

The general structure and operation of plug-ins is well known in the art. Consequently the specific process for creating payroll optimization plug-ins is omitted here to avoid detracting from the invention.

As discussed below, in one embodiment, at TRANSFORM THE PAYROLL MODIFICATION DATA INTO ONE OR MORE PAYROLL OPTIMIZATION PLUG-INS OPERATION 311 the specific additions, deletions, and/or modifications of payroll processing elements indicated by the contributing individual's payroll modification data are implemented by the one or more payroll optimization plug-ins. In one embodiment, the one or more payroll optimization plug-ins then add, delete, or modify the associated payroll processing functions, and/or the payroll configuration, and/or payroll preparation and management system as appropriate to create a consistent system.

As noted above, as used herein, the term payroll optimization plug-ins includes not only optimization plug-ins directed to specific taxes and tax rates, but also optimization plug-ins associated with other payroll functions such as, but not limited to, tax payer deductions, union dues, RRSP matching, sick pay, vacation time, garnishments, retirement savings, and/or any other payroll-related functions as discussed herein, and/or as known in the art at the time of filing, and/or as recognized/identified after the time of filing.

As a specific illustrative example, in one embodiment, if the contributing individual's payroll modification data adds a local farming employee tax (FEE tax) that is required in region X, then a payroll optimization plug-in is created for region X that includes the Fee tax in the total employee taxes (EE taxes) calculation so that EE taxes is calculated by adding employee federal taxes (EE fed tax) with employee state taxes (EE state tax) with employee local taxes (EE local tax) and the FEE tax, that is:

$$EE\text{ taxes}=EE\text{ fed tax}+EE\text{ state tax}+EE\text{ local tax}+FEE\text{ tax}.$$

In this example, the plug-in also results in the employee net pay (EE net pay) being calculated to include the Fee tax so that EE net pay is calculated as equal to employee gross pay (EE gross pay) minus EE taxes, calculated including the Fee tax, that is:

$$EE\text{ net pay}=EE\text{ gross pay}-(EE\text{ fed tax}+EE\text{ state tax}+EE\text{ local tax}+FEE\text{ tax}).$$

In one embodiment, once the contributing individuals' payroll modification data, i.e., the specific additions, deletions, and/or modifications of payroll processing elements for a region, and/or type of business activity, are transformed into one or more payroll optimization plug-ins at TRANSFORM THE PAYROLL MODIFICATION DATA INTO ONE OR MORE PAYROLL OPTIMIZATION PLUG-INS OPERATION 311, process flow proceeds to ASSOCIATE IDENTIFICATION DATA WITH EACH OF THE ONE OR MORE PAYROLL OPTIMIZATION PLUG-INS AND USE THE IDENTIFICATION DATA TO CATEGORIZE EACH OF THE ONE OR MORE PAYROLL OPTIMIZATION PLUG-INS OPERATION 313.

In one embodiment, at ASSOCIATE IDENTIFICATION DATA WITH EACH OF THE ONE OR MORE PAYROLL OPTIMIZATION PLUG-INS AND USE THE IDENTIFICATION DATA TO CATEGORIZE EACH OF THE ONE OR MORE PAYROLL OPTIMIZATION PLUG-INS OPERATION 313, the payroll optimization plug-ins of TRANSFORM THE PAYROLL MODIFICATION DATA INTO ONE OR MORE PAYROLL OPTIMIZATION PLUG-INS OPERATION 311 are assigned identification data and categorized according to their identification data.

In one embodiment, at ASSOCIATE IDENTIFICATION DATA WITH EACH OF THE ONE OR MORE PAYROLL OPTIMIZATION PLUG-INS AND USE THE IDENTIFICATION DATA TO CATEGORIZE EACH OF THE ONE OR MORE PAYROLL OPTIMIZATION PLUG-INS OPERATION 313 the system payroll modification identification data and/or the contributor payroll modification identification data used to tag the payroll modification data at OBTAIN PAYROLL MODIFICATION DATA FROM ONE OR MORE CONTRIBUTING INDIVIDUALS REPRESENTING THE CONTRIBUTING INDIVIDUALS' REGIONAL AND/OR ACTIVITY-BASED MODIFICATIONS OF THE PAYROLL PROCESSING ELEMENTS OPERATION 309 related to the payroll optimization plug-ins are assigned as identification data and used to categorize the payroll optimization plug-ins.

In various embodiments, the payroll optimization plug-in identification data of ASSOCIATE IDENTIFICATION DATA WITH EACH OF THE ONE OR MORE PAYROLL OPTIMIZATION PLUG-INS AND USE THE IDENTIFICATION DATA TO CATEGORIZE EACH OF THE ONE OR MORE PAYROLL OPTIMIZATION PLUG-INS OPERATION 313 includes, but is not limited to, data indicating any one or more of the following, the region associated with the contributing individual and/or payroll optimization plug-in; the specific business type and/or activity associated with the contributing individual and/or payroll optimization plug-in; the type of payroll tax associated with the contributing individual and/or payroll optimization plug-in; the tax agencies involved, e.g., the agency name, filling frequency, financial year, reporting standard; the various payroll tax rates calculated on net amount or region, location, type of business, tax type etc.

In one embodiment, once the payroll optimization plug-ins of TRANSFORM THE PAYROLL MODIFICATION DATA INTO ONE OR MORE PAYROLL OPTIMIZATION PLUG-INS OPERATION 311 are assigned identification data and categorized according to their identification data at ASSOCIATE IDENTIFICATION DATA WITH EACH OF THE ONE OR MORE PAYROLL OPTIMIZATION PLUG-INS AND USE THE IDENTIFICATION DATA TO CATEGORIZE EACH OF THE ONE OR MORE PAYROLL OPTIMIZATION PLUG-INS OPERATION 313, process flow proceeds to AGGREGATE PAYROLL OPTIMIZATION PLUG-INS OF THE SAME CATEGORY INTO PAYROLL OPTIMIZATION PLUG-IN SETS OPERATION 315.

In one embodiment, at AGGREGATE PAYROLL OPTIMIZATION PLUG-INS OF THE SAME CATEGORY INTO PAYROLL OPTIMIZATION PLUG-IN SETS OPERATION 315 all payroll optimization plug-ins of the same category are the aggregated into payroll optimization plug-in sets for the identified region and/or business activity categorization.

In one embodiment, at AGGREGATE PAYROLL OPTIMIZATION PLUG-INS OF THE SAME CATEGORY INTO PAYROLL OPTIMIZATION PLUG-IN SETS OPERATION 315 all payroll optimization plug-ins of the same category are the aggregated into payroll optimization plug-in sets for the identified region and/or business activity categorization under the direction of one or more processors, such as CPU 121 of FIG. 1, associated with one or more computing systems, such as process system 120 of FIG. 1.

Returning to FIG. 3, in one embodiment, once all payroll optimization plug-ins of the same category are the aggregated into payroll optimization plug-in sets for the identified region and/or business activity categorization at AGGREGATE PAYROLL OPTIMIZATION PLUG-INS OF THE SAME CATEGORY INTO PAYROLL OPTIMIZATION PLUG-IN SETS OPERATION 315, process flow proceeds to STORE DATA REPRESENTING THE PAYROLL OPTIMIZATION PLUG-IN SETS IN AN OPTIMIZATION PLUG-IN DATABASE OPERATION 317.

In one embodiment, at STORE DATA REPRESENTING THE PAYROLL OPTIMIZATION PLUG-IN SETS IN AN OPTIMIZATION PLUG-IN DATABASE OPERATION 317 the payroll optimization plug-in sets of AGGREGATE PAYROLL OPTIMIZATION PLUG-INS OF THE SAME CATEGORY INTO PAYROLL OPTIMIZATION PLUG-IN SETS OPERATION 315 are stored/added to a payroll optimization plug-in set database associated with the payroll preparation and management system.

In one embodiment, the payroll optimization plug-in set database of STORE DATA REPRESENTING THE PAYROLL OPTIMIZATION PLUG-IN SETS IN AN OPTIMIZATION PLUG-IN DATABASE OPERATION 317 includes all payroll optimization plug-ins submitted by contributing individuals from one or more tax regions.

In one embodiment, once the payroll optimization plug-in sets of AGGREGATE PAYROLL OPTIMIZATION PLUG-INS OF THE SAME CATEGORY INTO PAYROLL OPTIMIZATION PLUG-IN SETS OPERATION 315 are stored/added to a payroll optimization plug-in set database associated with the payroll preparation and management system at STORE DATA REPRESENTING THE PAYROLL OPTIMIZATION PLUG-IN SETS IN AN OPTIMIZATION PLUG-IN DATABASE OPERATION 317, process flow proceeds to REVIEW, RATE, AND/OR APPROVE THE PAYROLL OPTIMIZATION PLUG-IN SETS OPERATION 319.

In one embodiment, at REVIEW, RATE, AND/OR APPROVE THE PAYROLL OPTIMIZATION PLUG-IN SETS OPERATION 319 the payroll optimization plug-in sets are reviewed, rated, and/or approved for use.

In various embodiments, REVIEW, RATE, AND/OR APPROVE THE PAYROLL OPTIMIZATION PLUG-IN SETS OPERATION 319 is optional. In some embodiments, at REVIEW, RATE, AND/OR APPROVE THE PAYROLL OPTIMIZATION PLUG-IN SETS OPERATION 319 the payroll optimization plug-in sets are reviewed and/or rated, either actively or passively, by individuals who have implemented the payroll optimization plug-in sets.

In some embodiments, at REVIEW, RATE, AND/OR APPROVE THE PAYROLL OPTIMIZATION PLUG-IN SETS OPERATION 319 the payroll optimization plug-in sets are rated based on the reputation/history of the contributing individual. In some embodiments, at REVIEW, RATE, AND/OR APPROVE THE PAYROLL OPTIMIZATION PLUG-IN SETS OPERATION 319 the payroll optimization plug-in sets are reviewed and/or approved by the provider of the process for providing a payroll preparation platform with user contribution-based plug-ins and/or the payroll preparation and management system.

In one embodiment, once the payroll optimization plug-in sets are optionally reviewed, rated, and/or approved for use at REVIEW, RATE, AND/OR APPROVE THE PAYROLL OPTIMIZATION PLUG-IN SETS OPERATION 319, process flow proceeds to AN OPTIMIZATION SEEKING INDIVIDUAL REQUESTS PAYROLL OPTIMIZATION PLUG-INS FOR A REGION AND/OR ACTIVITY OPERATION 321.

In one embodiment, at AN OPTIMIZATION SEEKING INDIVIDUAL REQUESTS PAYROLL OPTIMIZATION PLUG-INS FOR A REGION AND/OR ACTIVITY OPERATION 321 an optimization seeking individual requests and/or selects one or more of the payroll optimization plug-in sets for a given region and/or activity of STORE DATA REPRESENTING THE PAYROLL OPTIMIZATION PLUG-IN SETS IN AN OPTIMIZATION PLUG-IN DATABASE OPERATION 317.

In one embodiment, at AN OPTIMIZATION SEEKING INDIVIDUAL REQUESTS PAYROLL OPTIMIZATION PLUG-INS FOR A REGION AND/OR ACTIVITY OPERATION 321 an optimization seeking individual requests and/or selects one or more of the payroll optimization plug-in sets for a given region and/or activity of STORE DATA REPRESENTING THE PAYROLL OPTIMIZATION PLUG-IN SETS IN AN OPTIMIZATION PLUG-IN DATABASE OPERATION 317 via an optimization seeking system, such as any computing system discussed herein, and/or as known in the art/available at the time of filing, and/or as developed/made available after the time of filing.

In one embodiment, at AN OPTIMIZATION SEEKING INDIVIDUAL REQUESTS PAYROLL OPTIMIZATION PLUG-INS FOR A REGION AND/OR ACTIVITY OPERATION 321 an optimization seeking individual requests and/or selects one or more of the payroll optimization plug-in sets for a given region and/or activity of STORE DATA REPRESENTING THE PAYROLL OPTIMIZATION PLUG-IN SETS IN AN OPTIMIZATION PLUG-IN DATABASE OPERATION 317 via one or more means for transferring data such as, but not limited to, providing the data through one or more network locations; e-mail; text message; POTS; or any other method, means, mechanism, process or procedure for transferring data discussed herein, and/or as known/available in the art at the time of filing, and/or as developed/made available after the time of filing.

In one embodiment, once an optimization seeking individual requests and/or selects one or more of the payroll optimization plug-in sets for a given region and/or activity of STORE DATA REPRESENTING THE PAYROLL OPTIMIZATION PLUG-IN SETS IN AN OPTIMIZATION PLUG-IN DATABASE OPERATION 317 at AN OPTIMIZATION SEEKING INDIVIDUAL REQUESTS PAYROLL OPTIMIZATION PLUG-INS FOR A REGION AND/OR ACTIVITY OPERATION 321, process flow proceeds to PROVIDE THE OPTIMIZATION SEEKING INDIVIDUAL THE PAYROLL OPTIMIZATION PLUG-IN SET FOR THE REQUESTED REGION AND/OR ACTIVITY OPERATION 323.

In one embodiment, at PROVIDE THE OPTIMIZATION SEEKING INDIVIDUAL THE PAYROLL OPTIMIZATION PLUG-IN SET FOR THE REQUESTED REGION AND/OR ACTIVITY OPERATION 323, the requested/selected payroll optimization plug-in set(s) of AN OPTIMIZATION SEEKING INDIVIDUAL REQUESTS PAYROLL OPTIMIZATION PLUG-INS FOR A REGION AND/OR ACTIVITY OPERATION 321 is imported to the optimization seeking individual's implementation of the payroll preparation and management system to optimize the optimization seeking individual's implementation of the payroll preparation and management system for the requested region, and/or type of business within the requested region.

In one embodiment, the one or more payroll optimization plug-ins provided at PROVIDE THE OPTIMIZATION SEEKING INDIVIDUAL THE PAYROLL OPTIMIZATION PLUG-IN SET FOR THE REQUESTED REGION AND/OR ACTIVITY OPERATION 323, add, delete, or modify the associated payroll processing functions, and/or the payroll configuration, and/or payroll preparation and management system as appropriate to create a consistent system.

In various embodiments, the payroll optimization plug-ins for a given region can be immediately adopted by other optimization seeking individuals PROVIDE THE OPTIMIZATION SEEKING INDIVIDUAL THE PAYROLL OPTIMIZATION PLUG-IN SET FOR THE REQUESTED REGION AND/OR ACTIVITY OPERATION 323. As noted above, in other embodiments, the payroll optimization plug-ins for a given region are first reviewed, and/or rated, and/or "approved" at REVIEW, RATE, AND/OR APPROVE THE PAYROLL OPTIMIZATION PLUG-IN SETS OPERATION 319 before they are provided at PROVIDE THE OPTIMIZATION SEEKING INDIVIDUAL THE PAYROLL OPTIMIZATION PLUG-IN SET FOR THE REQUESTED REGION AND/OR ACTIVITY OPERATION 323.

In one embodiment, once the requested/selected payroll optimization plug-in set(s) of AN OPTIMIZATION SEEKING INDIVIDUAL REQUESTS PAYROLL OPTIMIZATION PLUG-INS FOR A REGION AND/OR ACTIVITY OPERATION 321 is imported to the optimization seeking individual's implementation of the payroll preparation and management system to optimize the optimization seeking individual's implementation of the payroll preparation and management system for the requested region, and/or type of business within the requested region at PROVIDE THE OPTIMIZATION SEEKING INDIVIDUAL THE PAYROLL OPTIMIZATION PLUG-IN SET FOR THE REQUESTED REGION AND/OR ACTIVITY OPERATION 323, process flow proceeds to EXIT OPERATION 330.

In one embodiment, at EXIT OPERATION 330, process 300 for providing a payroll preparation platform with user contribution-based plug-ins is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process 300 for providing a payroll preparation platform with user contribution-based plug-ins discussed above, the payroll configuration of a payroll preparation and management system is optimized for a specific region and/or business type by individual users of the payroll preparation and management system and the optimization data is transformed into payroll optimization plug-ins. The payroll optimization plug-ins are then provided to other individuals. Consequently, using process 300 for providing a payroll preparation platform with user contribution-based plug-ins, region specific versions of payroll configurations used with payroll preparation and management systems are created and shared in an efficient and resource conserving manner.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for providing a payroll preparation platform with user contribution-based plug-ins comprising-the following, which when executed individually or collectively by any set of one or more processors perform a process including:
   receiving, at a first computing system implementing a first payroll preparation and management system executing on the first computing system, user input representing a first user-created customization of a payroll configuration;
   receiving user input designating a first portion of the first user-created customization as being sharable;
   receiving user input designating a second portion of the first user-created customization as not being sharable;
   receiving, at a second computing system from the first computing system, payroll modification data representing only the first portion of the first user-created customization of a payroll configuration;
   receiving, at a third computing system implementing a second payroll preparation and management system executing on the third computing system, user input representing a second user-created customization of a payroll configuration;
   receiving, at the second computing system from the third computing system, payroll modification data representing the second user-created customization of a payroll configuration;
   transforming, at a transformation module at the third computing system, the received payroll modification data into two or more payroll optimization plug-ins categorized according to a region associated with the payroll optimization plug-ins, wherein a plug-in is at least one software component that provides a specific payroll configuration;
   aggregating, at a data storage mechanism, sharable payroll optimization plug-ins of the same category into regional sharable payroll optimization plug-in sets;
   implementing, through an implementing individual selecting a first plug-in from the data storage mechanism, the first plug-in in a payroll preparation and management system of the implementing individual, the selected first plug-in being one of the transformed plug-ins originating as the first user-created customization of a payroll configuration; and
   generating a rating of the first plug-in, the rating being at least partly based on a reputation and/or history of an individual who provided the user input creating the first user-created customization of a payroll configuration, the rating being further at least partly based on a rating provided by the implementing individual.

2. The computing system implemented method for providing a payroll preparation platform with user contribution-based plug-ins of claim 1 wherein the payroll preparation and management system is a small business payroll preparation and management system.

3. The computing system implemented method for providing a payroll preparation platform with user contribution-based plug-ins of claim 1 wherein the contributing individual is a business owner or business employee who uses the payroll preparation and management system.

4. The computing system implemented method for providing a payroll preparation platform with user contribution-based plug-ins of claim 1 wherein the contributing individual is an application developer.

5. The computing system implemented method for providing a payroll preparation platform with user contribution-based plug-ins of claim 1 wherein the at least part of the payroll modification data that is transformed into one or more payroll optimization plug-ins is designated by the contributing individual.

6. The computing system implemented method for providing a payroll preparation platform with user contribution-based plug-ins of claim 1 wherein the one or more payroll optimization plug-ins are categorized according to the region associated with the payroll optimization plug-ins and the type of business activity associated with the contributing individuals.

7. The computing system implemented method for providing a payroll preparation platform with user contribution-based plug-ins of claim 1 wherein the one or more payroll optimization plug-ins are rated or approved before the optimization seeking individuals are provided the ability to import the payroll optimization plug-in sets.

8. A computing system implemented method for providing a payroll preparation platform with user contribution-based plug-ins comprising the following, which when executed individually or collectively by any set of one or more processors perform a process including:
   identifying one or more payroll processing functions performed by a payroll preparation and management system;
   decomposing the one or more payroll processing functions into payroll processing elements;
   receiving, at a first computing system implementing a first payroll preparation and management system executing on the first computing system, user input representing a first user-created customization of a payroll configuration, the first user-created customization of a payroll configuration including a modified one or more of the payroll processing elements;
   receiving user input designating a first portion of the first user-created customization as being sharable;
   receiving user input designating a second portion of the first user-created customization as not being sharable;
   receiving, at a second computing system from the first computing system, payroll modification data representing only the first portion of the first user-created customization of a payroll configuration;

receiving, at a third computing system implementing a second payroll preparation and management system executing on the third computing system, user input representing a second user-created customization of a payroll configuration, the second user-created customization of a payroll configuration including a modified one or more of the payroll processing elements;

receiving, at the second computing system from the third computing system, payroll modification data representing the second user-created customization of a payroll configuration;

transforming, at a transformation module at the third computing system, the received payroll modification data into two or more payroll optimization plug-ins categorized according to a region associated with the payroll optimization plug-ins, wherein a plug-in is at least one software component that provides a specific payroll configuration;

aggregating, at a data storage mechanism, sharable payroll optimization plug-ins of the same category into regional sharable payroll optimization plug-in sets;

implementing, through an implementing individual selecting a first plug-in from the data storage mechanism, the first plug-in in a payroll preparation and management system of the implementing individual, the selected first plug-in being one of the transformed plug-ins originating as the first user-created customization of a payroll configuration; and generating a rating of the first plug-in, the rating being at least partly based on a reputation and/or history of an individual who provided the user input creating the first user-created customization of a payroll configuration, the rating being further at least partly based on a rating provided by the implementing individual.

9. The computing system implemented method for providing a payroll preparation platform with user contribution-based plug-ins of claim 8 wherein the one or more payroll processing functions are decomposed into payroll processing elements using a Domain Specific Language (DSL).

10. The computing system implemented method for providing a payroll preparation platform with user contribution-based plug-ins of claim 8 wherein the contributing individual is a business owner or business employee who uses the payroll preparation and management system.

11. The computing system implemented method for providing a payroll preparation platform with user contribution-based plug-ins of claim 8 wherein the contributing individual is an application developer.

12. The computing system implemented method for providing a payroll preparation platform with user contribution-based plug-ins of claim 8 wherein the at least part of the payroll modification data that is transformed into one or more payroll optimization plug-ins is designated by the contributing individual.

13. The computing system implemented method for providing a payroll preparation platform with user contribution-based plug-ins of claim 8 wherein the one or more payroll optimization plug-ins are categorized according to the region associated with the payroll optimization plug-ins and the type of business activity associated with the contributing individuals.

14. The computing system implemented method for providing a payroll preparation platform with user contribution-based plug-ins of claim 8 wherein the one or more payroll optimization plug-ins are rated or approved before the optimization seeking individuals are provided the ability to import the payroll optimization plug-in sets.

15. A computer program product for providing a payroll preparation platform with user contribution-based plug-ins comprising:

a nontransitory computer readable medium;

and computer program code, encoded on the computer readable medium, comprising computer readable instructions which, when executed via any set of one or more processors, perform the following:

receiving, at a first computing system implementing a first payroll preparation and management system executing on the first computing system, user input representing a first user-created customization of a payroll configuration;

receiving user input designating a first portion of the first user-created customization as being sharable;

receiving user input designating a second portion of the first user-created customization as not being sharable;

receiving, at a second computing system from the first computing system, payroll modification data representing only the first portion of the first user-created customization of a payroll configuration;

receiving, at a third computing system implementing a second payroll preparation and management system executing on the third computing system, user input representing a second user-created customization of a payroll configuration;

receiving, at the second computing system from the third computing system, payroll modification data representing the second user-created customization of a payroll configuration;

transforming, at a transformation module at the third computing system, the received payroll modification data into two or more payroll optimization plug-ins categorized according to a region associated with the payroll optimization plug-ins, wherein a plug-in is at least one software component that provides a specific payroll configuration;

aggregating, at a data storage mechanism, sharable payroll optimization plug-ins of the same category into regional sharable payroll optimization plug-in sets;

implementing, through an implementing individual selecting a first plug-in from the data storage mechanism, the first plug-in in a payroll preparation and management system of the implementing individual, the selected first plug-in being one of the transformed plug-ins originating as the first user-created customization of a payroll configuration; and generating a rating of the first plug-in, the rating being at least partly based on a reputation and/or history of an individual who provided the user input creating the first user-created customization of a payroll configuration, the rating being further at least partly based on a rating provided by the implementing individual.

16. The computer program product for providing a payroll preparation platform with user contribution-based plug-ins of claim 15 wherein the payroll preparation and management system is a small business payroll preparation and management system.

17. The computer program product for providing a payroll preparation platform with user contribution-based plug-ins of claim 15 wherein the contributing individual is a business owner or business employee who uses the payroll preparation and management system.

18. The computer program product for providing a payroll preparation platform with user contribution-based plug-ins of claim 15 wherein the contributing individual is an application developer.

19. The computer program product for providing a payroll preparation platform with user contribution-based plug-ins of claim 15 wherein the at least part of the payroll modification data that is transformed into one or more payroll optimization plug-ins is designated by the contributing individual.

20. The computer program product for providing a payroll preparation platform with user contribution-based plug-ins of claim 15 wherein the one or more payroll optimization plug-ins are categorized according to the region associated with the payroll optimization plug-ins and the type of business activity associated with the contributing individuals.

21. The computer program product for providing a payroll preparation platform with user contribution-based plug-ins of claim 15 wherein the one or more payroll optimization plug-ins are rated or approved before the optimization seeking individuals are provided the ability to import the payroll optimization plug-in sets.

22. A computer program product for providing a payroll preparation platform with user contribution-based plug-ins comprising:
   a nontransitory computer readable medium;
   and computer program code, encoded on the computer readable medium, comprising computer readable instructions which, when executed via any set of one or more processors, perform the following:
   identifying one or more payroll processing functions performed by a payroll preparation and management system;
   decomposing the one or more payroll processing functions into payroll processing elements;
   receiving, at a first computing system implementing a first payroll preparation and management system executing on the first computing system, user input representing a first user-created customization of a payroll configuration, the first user-created customization of a payroll configuration including a modified one or more of the payroll processing elements;
   receiving user input designating a first portion of the first user-created customization as being sharable;
   receiving user input designating a second portion of the first user-created customization as not being sharable;
   receiving, at a second computing system from the first computing system, payroll modification data representing only the first portion of the first user-created customization of a payroll configuration;
   receiving, at a third computing system implementing a second payroll preparation and management system executing on the third computing system, user input representing a second user-created customization of a payroll configuration, the second user-created customization of a payroll configuration including a modified one or more of the payroll processing elements;
   receiving, at the second computing system from the third computing system, payroll modification data representing the second user-created customization of a payroll configuration;
   transforming, at a transformation module at the third computing system, the received payroll modification data into two or more payroll optimization plug-ins categorized according to a region associated with the payroll optimization plug-ins, wherein a plug-in is at least one software component that provides a specific payroll configuration;
   aggregating, at a data storage mechanism, sharable payroll optimization plug-ins of the same category into regional sharable payroll optimization plug-in sets;
   implementing, through an implementing individual selecting a first plug-in from the data storage mechanism, the first plug-in in a payroll preparation and management system of the implementing individual, the selected first plug-in being one of the transformed plug-ins originating as the first user-created customization of a payroll configuration; and
   generating a rating of the first plug-in, the rating being at least partly based on a reputation and/or history of an individual who provided the user input creating the first user-created customization of a payroll configuration, the rating being further at least partly based on a rating provided by the implementing individual.

23. The computer program product for providing a payroll preparation platform with user contribution-based plug-ins of claim 22 wherein the one or more payroll processing functions are decomposed into payroll processing elements using a Domain Specific Language (DSL).

24. The computer program product for providing a payroll preparation platform with user contribution-based plug-ins of claim 22 wherein the contributing individual is a business owner or business employee who uses the payroll preparation and management system.

25. The computer program product for providing a payroll preparation platform with user contribution-based plug-ins of claim 22 wherein the contributing individual is an application developer.

26. The computer program product for providing a payroll preparation platform with user contribution-based plug-ins of claim 22 wherein the at least part of the payroll modification data that is transformed into one or more payroll optimization plug-ins is designated by the contributing individual.

27. The computer program product for providing a payroll preparation platform with user contribution-based plug-ins of claim 22 wherein the one or more payroll optimization plug-ins are categorized according to the region associated with the payroll optimization plug-ins and the type of business activity associated with the contributing individuals.

28. The computer program product for providing a payroll preparation platform with user contribution-based plug-ins of claim 22 wherein the one or more payroll optimization plug-ins are rated or approved before the optimization seeking individuals are provided the ability to import the payroll optimization plug-in sets.

29. A system for providing a payroll preparation platform with user contribution-based plug-ins comprising:
   at least one processor; and
   at least one memory coupled to the at least one processor, the at least one memory having stored therein instructions which when executed by any set of the one or more processors, perform a process for providing a payroll preparation platform with user contribution-based plug-ins, the process for providing a payroll preparation platform with user contribution-based plug-ins including:
   receiving, at a first computing system implementing a first payroll preparation and management system executing on the first computing system, user input representing a first user-created customization of a payroll configuration;
   receiving user input designating a first portion of the first user-created customization as being sharable;
   receiving user input designating a second portion of the first user-created customization as not being sharable;

receiving, at a second computing system from the first computing system, payroll modification data representing only the first portion of the first user-created customization of a payroll configuration;

receiving, at a third computing system implementing a second payroll preparation and management system executing on the third computing system, user input representing a second user-created customization of a payroll configuration;

receiving, at the second computing system from the third computing system, payroll modification data representing the second user-created customization of a payroll configuration;

transforming, at a transformation module at the third computing system, the received payroll modification data into two or more payroll optimization plug-ins categorized according to a region associated with the payroll optimization plug-ins, wherein a plug-in is at least one software component that provides a specific payroll configuration;

aggregating, at a data storage mechanism, sharable payroll optimization plug-ins of the same category into regional sharable payroll optimization plug-in sets;

implementing, through an implementing individual selecting a first plug-in from the data storage mechanism, the first plug-in in a payroll preparation and management system of the implementing individual, the selected first plug-in being one of the transformed plug-ins originating as the first user-created customization of a payroll configuration; and generating a rating of the first plug-in, the rating being at least partly based on a reputation and/or history of an individual who provided the user input creating the first user-created customization of a payroll configuration, the rating being further at least partly based on a rating provided by the implementing individual.

30. The system for providing a payroll preparation platform with user contribution-based plug-ins of claim 29 wherein the payroll preparation and management system is a small business payroll preparation and management system.

31. The system for providing a payroll preparation platform with user contribution-based plug-ins of claim 29 wherein the contributing individual is a business owner or business employee who uses the payroll preparation and management system.

32. The system for providing a payroll preparation platform with user contribution-based plug-ins of claim 29 wherein the contributing individual is an application developer.

33. The system for providing a payroll preparation platform with user contribution-based plug-ins of claim 29 wherein the at least part of the payroll modification data that is transformed into one or more payroll optimization plug-ins is designated by the contributing individual.

34. The system for providing a payroll preparation platform with user contribution-based plug-ins of claim 29 wherein the one or more payroll optimization plug-ins are categorized according to the region associated with the payroll optimization plug-ins and the type of business activity associated with the contributing individuals.

35. The system for providing a payroll preparation platform with user contribution-based plug-ins of claim 29 wherein the one or more payroll optimization plug-ins are rated or approved before the optimization seeking individuals are provided the ability to import the payroll optimization plug-in sets.

36. A system for providing a payroll preparation platform with user contribution-based plug-ins comprising:

at least one processor; and at least one memory coupled to the at least one processor, the at least one memory having stored therein instructions which when executed by any set of the one or more processors, perform a process for providing a payroll preparation platform with user contribution-based plug-ins, the process for providing a payroll preparation platform with user contribution-based plug-ins including:

identifying one or more payroll processing functions performed by a payroll preparation and management system;

decomposing the one or more payroll processing functions into payroll processing elements;

receiving, at a first computing system implementing a first payroll preparation and management system executing on the first computing system, user input representing a first user-created customization of a payroll configuration, the first user-created customization of a payroll configuration including a modified one or more of the payroll processing elements;

receiving user input designating a first portion of the first user-created customization as being sharable;

receiving user input designating a second portion of the first user-created customization as not being sharable;

receiving, at a second computing system from the first computing system, payroll modification data representing only the first portion of the first user-created customization of a payroll configuration;

receiving, at a third computing system implementing a second payroll preparation and management system executing on the third computing system, user input representing a second user-created customization of a payroll configuration, the second user-created customization of a payroll configuration including a modified one or more of the payroll processing elements;

receiving, at the second computing system from the third computing system, payroll modification data representing the second user-created customization of a payroll configuration;

transforming, at a transformation module at the third computing system, the received payroll modification data into two or more payroll optimization plug-ins categorized according to a region associated with the payroll optimization plug-ins, wherein a plug-in is at least one software component that provides a specific payroll configuration;

aggregating, at a data storage mechanism, sharable payroll optimization plug-ins of the same category into regional sharable payroll optimization plug-in sets;

implementing, through an implementing individual selecting a first plug-in from the data storage mechanism, the first plug-in in a payroll preparation and management system of the implementing individual, the selected first plug-in being one of the transformed plug-ins originating as the first user-created customization of a payroll configuration; and generating a rating of the first plug-in, the rating being at least partly based on a reputation and/or history of an individual who provided the user input creating the first user-created customization of a payroll configuration, the rating being further at least partly based on a rating provided by the implementing individual.

37. The system for providing a payroll preparation platform with user contribution-based plug-ins of claim 36 wherein the one or more payroll processing functions are decomposed into payroll processing elements using a Domain Specific Language (DSL).

38. The system for providing a payroll preparation platform with user contribution-based plug-ins of claim 36 wherein the contributing individual is a business owner or business employee who uses the payroll preparation and management system.

39. The system for providing a payroll preparation platform with user contribution-based plug-ins of claim 36 wherein the contributing individual is an application developer.

40. The system for providing a payroll preparation platform with user contribution-based plug-ins of claim 36 wherein the at least part of the payroll modification data that is transformed into one or more payroll optimization plug-ins is designated by the contributing individual.

41. The system for providing a payroll preparation platform with user contribution-based plug-ins of claim 36 wherein the one or more payroll optimization plug-ins are categorized according to the region associated with the payroll optimization plug-ins and the type of business activity associated with the contributing individuals.

42. The system for providing a payroll preparation platform with user contribution-based plug-ins of claim 36 wherein the one or more payroll optimization plug-ins are rated or approved before the optimization seeking individuals are provided the ability to import the payroll optimization plug-in sets.

* * * * *